(12) United States Patent
Geirhofer et al.

(10) Patent No.: US 9,559,820 B2
(45) Date of Patent: Jan. 31, 2017

(54) FEEDBACK REPORTING BASED ON CHANNEL STATE INFORMATION REFERENCE SIGNAL (CSI-RS) GROUPS

(75) Inventors: Stefan Geirhofer, San Diego, CA (US); Tao Luo, San Diego, CA (US); Wanshi Chen, San Diego, CA (US); Peter Gaal, San Diego, CA (US); Hao Xu, San Diego, CA (US); Kapil Bhattad, San Diego, CA (US); Tingfang Ji, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 294 days.

(21) Appl. No.: 13/359,154

(22) Filed: Jan. 26, 2012

(65) Prior Publication Data

US 2013/0021926 A1 Jan. 24, 2013

Related U.S. Application Data

(60) Provisional application No. 61/444,568, filed on Feb. 18, 2011, provisional application No. 61/444,979, (Continued)

(51) Int. Cl.
*H04L 12/22* (2006.01)
*H04L 5/00* (2006.01)

(52) U.S. Cl.
CPC .................................. *H04L 5/0048* (2013.01)

(58) Field of Classification Search
None
See application file for complete search history.

(56) References Cited

U.S. PATENT DOCUMENTS

| 2008/0273513 A1 | 11/2008 | Montojo et al. |
| 2009/0325585 A1 | 12/2009 | Farajidana et al. |

(Continued)

FOREIGN PATENT DOCUMENTS

| CN | 101867458 A | 10/2010 |
| CN | 101917260 A | 12/2010 |

(Continued)

OTHER PUBLICATIONS

Iwanura et al., "Carrier Aggregation Framework in 3GPP LTE-Advanced" WIMAX/LTE Update, IEEE Communications Magazine, pp. 60-67 (Aug. 2010).

(Continued)

*Primary Examiner* — Yemane Mesfin
*Assistant Examiner* — Jeff Banthrongsack
(74) *Attorney, Agent, or Firm* — Seyfarth Shaw LLP

(57) ABSTRACT

In macro/RRH setups, channel state information reference signals (CSI-RS) and demodulation reference signals (DM-RS) may be used to decouple control and data transmission. Data transmission (e.g. for LTE Rel 10 and beyond) may be based on CSI-RS and DM-RS, while control may be received from a different set of cells or TxPs via CRS. Certain aspects of the present disclosure introduce a reporting framework, in which configuration of data-serving cells/TxPs may be carried out based on CSI-RS. In certain aspects, a new concept of CSI-RS groups, i.e., a set of CSI-RS ports that a UE considers as one group for precoding matrix indicator (PMI)/channel quality indicator (CQI)/rank indicator (RI) reporting, may be defined.

55 Claims, 15 Drawing Sheets

Related U.S. Application Data filed on Feb. 21, 2011, provisional application No. 61/524,034, filed on Aug. 16, 2011.

(56) References Cited

U.S. PATENT DOCUMENTS

| | | | |
|---|---|---|---|
| 2010/0035555 | A1 | 2/2010 | Bala et al. |
| 2011/0194551 | A1* | 8/2011 | Lee ..................... H04B 7/0626 370/342 |
| 2011/0199986 | A1 | 8/2011 | Fong et al. |
| 2011/0237270 | A1 | 9/2011 | Noh et al. |
| 2012/0009959 | A1 | 1/2012 | Yamada et al. |
| 2012/0063500 | A1* | 3/2012 | Wang et al. .................. 375/224 |
| 2012/0076040 | A1 | 3/2012 | Hoshino et al. |
| 2012/0082248 | A1* | 4/2012 | Han et al. ..................... 375/259 |
| 2012/0088458 | A1 | 4/2012 | Nogami et al. |
| 2012/0176939 | A1* | 7/2012 | Qu ........................ H04L 5/0023 370/255 |
| 2012/0201154 | A1 | 8/2012 | Chandrasekhar et al. |
| 2012/0314629 | A1 | 12/2012 | Ng |
| 2013/0028182 | A1 | 1/2013 | Geirhofer et al. |
| 2013/0148611 | A1 | 6/2013 | Moulsley et al. |
| 2013/0163687 | A1* | 6/2013 | Jing et al. ..................... 375/267 |
| 2013/0235756 | A1 | 9/2013 | Seo et al. |
| 2013/0315197 | A1 | 11/2013 | Park et al. |

FOREIGN PATENT DOCUMENTS

| | | | |
|---|---|---|---|
| EP | 2410671 | A2 | 1/2012 |
| EP | 2466836 | A2 | 6/2012 |
| EP | 2568622 | A1 * | 3/2013 |
| JP | 2010263414 | A | 11/2010 |
| JP | 2011004212 | A | 1/2011 |
| JP | 2012521145 | A | 9/2012 |
| JP | 2013502136 | A | 1/2013 |
| WO | 2008137786 | | 11/2008 |
| WO | 2008137864 | | 11/2008 |
| WO | 2009157168 | A1 | 12/2009 |
| WO | 2010064842 | A2 | 6/2010 |
| WO | 2010103886 | A1 | 9/2010 |
| WO | 2010107267 | A2 | 9/2010 |
| WO | 2010140298 | A1 | 12/2010 |
| WO | 2011019230 | A2 | 2/2011 |
| WO | 2012094608 | A2 | 7/2012 |

OTHER PUBLICATIONS

Catt, "Interference Measurement over Muted RE", 3GPP Draft; R1-105922, 3rd Generation Partnershi P Project (3GPP), MOB1 Le Competence Centre ; 650, Route Des Lucioles ; F-06921 Sophia-Anti Polis Cedex ; France, vol. RAN WG1, no. Jacksonville, USA; Nov. 15, 2010, Nov. 9, 2010, XP050489452.
Ericsson et al: "Baseline Schemes and Focus of CoMP Studies", 3GPP Draft; RI-110461 Comp High Level, 3rd Generation Partnership Project T3GPP), Mobile Competence Centre; 650, Route Des Lucioles; F-06921 Sophia-Antipolis Cedex; France, vol. RAN WG1, no. Dublin, Ireland; Jan. 17, 2011, Jan. 12, 2011, XP050490347, [retrieved on Jan. 12, 2011] A p. 2, paragraph 3-7.
Ericsson et al., "Further Details on CSI RS Configuration" , 3GPP Draft; R1-105322 CSI RS Config, 3rd Generation Partnership Project (3GPP), Mobile Competence Centre ; 650, Route Des Lucioles ; F-06921 Sophia-Anti Polis Cedex ; France, vol. RAN WG1, no. Xian; Oct. 11, 2010, Oct. 5, 2010, XP050450483.
Etri, "Discussion on further details of Scenario 4", 3GPP Draft; R1-111000 Comp Scenario 4, 3rd Generation Partnership Project (3GPP), Mobile Competence Centre ; 650, Route Des Lucioles ; F-06921 Sophia-Antipolis Cedex ; France, vol. RAN WG1, no. Taipei, Taiwan; Feb. 21, 2011, Feb. 15, 2011, XP050490699
Huawei: "Consideration on CSI-RS design for CoMP and text proposal to 36.814", 3GPP Draft; R1-093031 Consideration on CSI-RS Design for Comp and Text Proposal to 36.814, 3rd Generation Partnership Project (3GPP), Mobile Competence Centre ; 650, Route Des Lucioles ; F-06921 Sophia-Antipolis Cedex ; France, no. Shenzhen, China; Aug. 18, 2009, XP050351428, [retrieved on Aug. 18, 2009].
Huawei: "CSI-RS Pattern Signaling", 3GPP Draft; R1-104290 CSI RS Pattern Signalling, 3rd Generation Partnership Project (3GPP), Mobile Competence Centre ; 650, Route Des Lucioles ; F-06921 Sophia-Antipolis Cedex ; France, vol. RAN WG1, no. Madrid, Spain; Aug. 23, 2010, Aug. 17, 2010, XP050449655, [retrieved on Aug. 17, 2010].
Huawei, et al., "Remaining issues on CSI RS signalling", 3GPP Draft; R1-105131, 3rd Generation Partnership Project (3GPP), Mobile Competence Centre, 650, Route Des Lucioles, F-06921 Soph Ia-Anti POL1 S Cedex, France, vol. RAN WG1, no. X i an; Oct. 11, 2010, Oct. 5, 2010, XP050450352, [retrieved on Oct. 5, 2010].
International Search Report and Written Opinion—PCT/US2012/022915—ISA/EPO—Aug. 16, 2012.
MediaTek Inc., "Discussion on CQI Reference Resource", 3GPP Draft; R1-110144, 3rd Generation Partnership Project (3GPP), Mobile Competence Centre ; 650, Route Des Lucioles ; F-06921 Sophia-Antipolis Cedex ; RAN WG1, no. Dublin, Ireland; Jan. 17, 2011, Jan. 12, 2011, France vol., XP050490317, [retrieved on Jan. 12, 2011].
New Postcom, "Remaining issues in CSI-RS signalling design", 3GPP Draft; R1-105222 Remaining Issues I N CSI -RS Signalling DESTGN Final, 3rd Generation Partnership Project (3GPP), Mobile Competence Centre ; 650, Route Des Lucioles ; F-06921 Sophia-Anti Polis Cedex ; France, vol. RAN WG1, no. X i 'an; Oct. 11, 2010, Oct. 4, 2010, XP050450327.
NTT DoCoMo, Intra-cell CSI -RS designu, 3GPP Draft; R1-103253 Intra-Cell CSI RS, 3rd Generation Partnership Project (3GPP), Mobile Competence Centre ; 650, Route Des Luci Oles ; F-06921 Sophi A-Anti POL1 S Cedex ; France, vol. RAN WG1, no. Montreal, Canada; May 10, 2010, May 4, 2010 , XP050420281.
Panasonic, "CoMP Operation Image and UE demodulation/feedback Configuration", 3GPP Draft; R1-093948, 3rd Generation Partnership Project (3GPP), MOB1 Le Competence Centre ; 650, Route Des Lucioles ; F-06921 Sophia-Anti Poli S Cedex ; France, no. Miyazaki; Oct. 12, 2009, Oct. 1, 2009, XP050388448.
Partial International Search Report—PCT/US2012/022915—ISA/EPO—May 7, 2012.
Qualcomm Inc, "CSI -RS Sequence for Different Antenna Ports", 3GPP Draft; R1-110500 CSI-RS Sequence, 3rd Generation Partnership Project (3GPP), Mobile Competence Centre ; 650, Route Des Lucioles ; F-06921 Sophia-Anti Polis Cedex ; France, vol. RAN WG1, no. Dublin, Ireland; Jan. 17, 2011, Jan. 11, 2011, XP050490304.
Qualcomm Incorporated, "CSI measurement reference", 3GPP Draft; R1-110337 CSI Measurement Reference, 3rd Generation Partnership Project (3GPP), Mobile Competence Centre ; 650, Route Des Lucioles ; F-06921 Sophia-Anti Polis Cedex ; France, vol. RAN WG1, no. Dublin, Ireland; Jan. 17, 2011, Jan. 11, 2011, XP050474483, [retrieved on Jan. 11, 2011].
Qualcomm Incorporated, "CSI -RS configuration in support of downlink CoMP" , 3GPP Draft; R1-114113 CSI -RS Configuration I N Support of Downlink CoMP, 3rd Generation Partnership Project (3GPP), Mobile Competence Centre ; 650, Route Des Lucioles ; F-06921 Sophia-Antipolis Cedex ; France, vol. RAN WG1, no. San Francisco, USA; Nov. 14-18, 2011, Nov. 8, 2011 , XP050562089.
Qualcomm Incorporated, "Downlink control signaling in support of downlink CoMP" , 3GPP Draft; R1-114115 Downlink Control Signaling I N Support of Downlink Comp, 3rd Generation Partnershi P Project (3GPP), Mobile Competence Centre ; 650, Route Des Lucioles ; F-06921 Sophia-Antipolis Cedex ; France, vol. . RAN WG1, no. San Franci sco, USA; Nov. 14-18, 2011, Nov. 8, 2011 , XP050562091.
Samsung, "Compari son between Explicit and Implicit Feedbacks for CoMP" , 3GPP Draft; R1-092655 Comparison Between Explicit and Implicit Feedbacks for CoMP, 3rd Generation Partnership Project (3GPP), Mobile Competence Centre ; 650, Route Des Lucioles ; F-06921 Sophia-Anti Poli S Cedex ; France, no. Los Angeles, USA; Jun. 24, 2009, XP050351139.

(56) References Cited

OTHER PUBLICATIONS

Samsung, "Discussion on CoMP with Implicit CQI Feedback", 3GPP Draft; R1-094093 Discussion on Comp With Implicit CQI Feedback, 3rd Generation Partnership Project (3GPP), Mobile Competence Centre ; 650, Route Des Lucioles ; F-06921 Sophia-Anti Poli S Cedex ; France, No. Miyazaki; Oct. 12, 2009, XP050388569.

Alcatel-Lucent et al., "Further Details of CoMP Scenarios for Evaluation, Especially Scenario 4", 3GPP TSG RAN WG1 #64, R1-110802, Feb. 15, 2011, pp. 1-8, Retrieved from URL: http://www.3gpp.org/ftp/tsg_ran/WG1_RL1/TSGR1_64/Docs/R1-110802.zip.

Ericsson: "Aspects on Distributed RRUs with Shared Cell-ID for Heterogeneous Deployments", 3GPP TSG-RAN WG1#64 R1-110649, Feb. 21, 2011, pp. 1-12.

LG Electronics: "Details of CSI Reporting in Time-domain eICIC", 3GPP TSG RAN WG1 Meeting #63bis R1-110381, Jan. 17, 2011, pp. 1-6.

Qualcomm Incorporated: "Finalizing Signaling and Configuration of CSI-RS", 3GPP Draft; R1-105565 Finalizing Signaling and Configuration of CSI-RS, 3rd Generation Partnership Project (3GPP), Mobile Competence Centre ; 650, Route Des Lucioles ; F-06921 Sophia-Antipolis Cedex ; France, vol. RAN WGI, no. Xian; Oct. 11, 2010, Oct. 5, 2010, XP050450663, [retrieved on Oct. 5, 2010].

NTT DOCOMO: "CoMP with Lower Tx Power RRH in Heterogeneous Network", 3GPP Draft; R1-110867 Comp in Hetnet, 3RD Generation Partnership Project (3GPP), Mobile Competence Centre; 650, Route Des Lucioles; F-06921 Sophia-Antipolis Cedex; France, vol. RAN WG1, No. Taipei, Taiwan; 20110221, pp. 1-8, XP050490635, Feb. 15, 2011 (Feb. 15, 2011).

CMCC: "Views on UE capabilities for Rel-10 DL MIMO", 3GPP Draft; R1-110517 Views on UE Capabilities for Rel-10 DL MIMO, 3rd Generation Partnership Project (3GPP), Mobile Competence Centre; 650, Route Des Lucioles; F-06921 Sophia-Antipolis Cedex; France, vol. RAN WG1, No. Dublin, Ireland; 20110617-20110621, Jan. 31, 2011 (Jan. 31, 2011), XP050599074, [retrieved on Jan. 31, 2011].

LG Electronics: "Discussions on CSI feedback enhancement", 3GPP Draft; R1-111788_LG_CSI_Feedback, 3rd Generation Partnership (3GPP), Mobile Competence Centre; 650, Route Des Lucioles; F-06921 Sophia-Antipolis Cedex; France, vol. RAN WG1, No. Barcelona, Spain; 20110509, May 5, 2011 (May 5, 2011), XP050491432, [retrieved on May 5, 2011].

Pantech: "Feedback issues for Macro site CoMp", 3GPP Draft; R1-110756, 3rd Generation Partnership Project (3GPP), Mobile Competence Centre; 650, Route Des Lucioles; F-06921 Sophia-Antipolis Cedex; France, vol. RAN WG1, No. Taipei, Taiwan; 20110221, Feb. 17, 2011 (Feb. 17, 2011), XP050490755, [retrieved on Feb. 17, 20122].

* cited by examiner

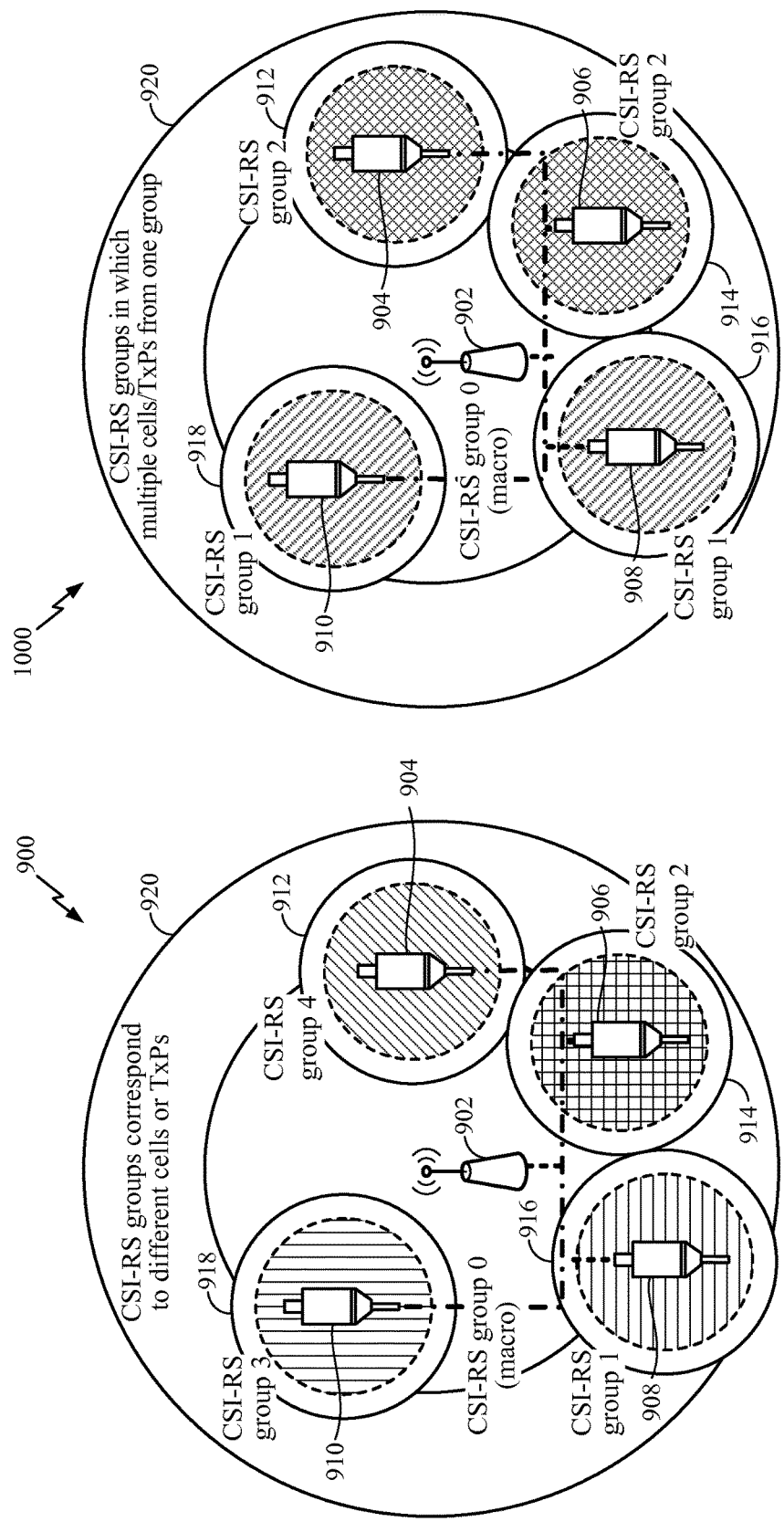

FEEDBACK REPORTING BASED ON CHANNEL STATE INFORMATION REFERENCE SIGNAL (CSI-RS) GROUPS

CROSS-REFERENCE TO RELATED APPLICATIONS

This application claims benefit of U.S. Provisional Patent Application Ser. No. 61/444,568 filed on Feb. 18, 2011, Ser. No. 61/444,979 filed on Feb. 21, 2011, and Ser. No. 61/524,034 filed on Aug. 16, 2011, which are incorporated herein by reference in their entirety for all purposes.

BACKGROUND

Field

The present disclosure relates generally to communication systems, and more particularly, to feedback reporting based on channel state information reference signal (CSI-RS) groups.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In macro/RRH setups, channel state information reference signals (CSI-RS) and demodulation reference signals (DM-RS) may be used to decouple control and data transmission. Data transmission (e.g. for LTE Rel 10 and beyond) may be based on CSI-RS and DM-RS, while control may be received from a possibly different set of cells or TxPs via CRS. Traditionally, selection of cells or TxPs for data transmission is based on monitoring channel specific reference signals (CRS). However, due to the decoupling of control versus data "anchor" cells/transmission points (TxPs), the CRS may not be available for selecting cells/TxPs for data transmission. Therefore, a need exists for an alternative to CRS based configuration of data-serving cells/TxPs. Certain aspects of the present disclosure introduce a reporting framework, in which this may be carried out based on CSI-RS. In certain aspects, a new concept of CSI-RS groups, i.e., a set of CSI-RS ports of a UE that a UE considers as one group for precoding matrix indicator (PMI)/channel quality indicator (CQI)/rank indicator (RI) reporting, may be defined. In an aspect, a UE may consider a group by itself and perform reporting except that it may disregard all CSI-RS outside a specific CSI-RS group.

Certain aspects of the present disclosure provide a method for wireless communications. The method generally includes determining one or more channel state information reference signal (CSI-RS) groups for feedback reporting by a UE, transmitting an indicator, to the UE, the indicator identifying the one or more CSI-RS groups, and receiving feedback reports from the UE, corresponding to one or more of the CSI-RS groups.

Certain aspects of the present disclosure provide an apparatus for wireless communications. The apparatus generally includes at least one processor configured to determine one or more channel state information reference signal (CSI-RS) groups for feedback reporting by a UE and transmit an indicator, to the UE, the indicator identifying the one or more CSI-RS groups. The apparatus further includes a receiver configured to receive feedback reports from the UE, corresponding to one or more of the CSI-RS groups.

Certain aspects of the present disclosure include an apparatus for wireless communications. The apparatus generally includes means for determining one or more channel state information reference signal (CSI-RS) groups for feedback reporting by a UE, means for transmitting an indicator, to the UE, the indicator identifying the one or more CSI-RS groups, and means for receiving feedback reports from the UE, corresponding to one or more of the CSI-RS groups.

Certain aspects of the present disclosure include a computer-program product for wireless communication. The computer-program product generally includes a computer-readable medium including code for determining one or more channel state information reference signal (CSI-RS) groups for feedback reporting by a UE, transmitting an indicator, to the UE, the indicator identifying the one or more CSI-RS groups, and receiving feedback reports from the UE, corresponding to one or more of the CSI-RS groups.

Certain aspects of the present disclosure include a method for wireless communication. The method generally includes determining one or more channel state information reference signal (CSI-RS) groups, that a user equipment (UE) groups for feedback reporting, performing channel measurements for one or more of the CSI-RS groups, and transmitting a feedback report, the feedback report corresponding to channel measurements of at least one of the CSI-RS groups.

Certain aspects of the present disclosure include an apparatus for wireless communications. The apparatus generally includes at least one processor configured to determine one or more channel state information reference signal (CSI-RS) groups, which a user equipment (UE) groups for feedback reporting and perform channel measurements for one or more of the CSI-RS groups. The apparatus further includes a transmitter configured to transmit a feedback report, the feedback report corresponding to channel measurements of at least one of the CSI-RS groups.

Certain aspects of the present disclosure provide an apparatus for wireless communications. The apparatus generally includes means for determining one or more channel state information reference signal (CSI-RS) groups, that a user equipment (UE) groups for feedback reporting, means for performing channel measurements for one or more of the CSI-RS groups, and means for transmitting a feedback report, the feedback report corresponding to channel measurements of at least one of the CSI-RS groups.

Certain aspects of the present disclosure provide a computer-program product for wireless communications. The computer-program product generally includes a computer-readable medium comprising code for determining one or more channel state information reference signal (CSI-RS) groups, that a user equipment (UE) groups for feedback reporting, performing channel measurements for one or more of the CSI-RS groups, and transmitting a feedback report, the feedback report corresponding to channel measurements of at least one of the CSI-RS groups.

BRIEF DESCRIPTION OF THE DRAWINGS

FIG. 9 is a diagram illustrating CSI-RS groups corresponding to different cells in accordance with certain aspects of the present disclosure.

FIG. 10 is a diagram illustrating CSI-RS groups in which multiple cells/TxPs form one group in accordance with certain aspects of the present disclosure.

DETAILED DESCRIPTION

Figure 1:
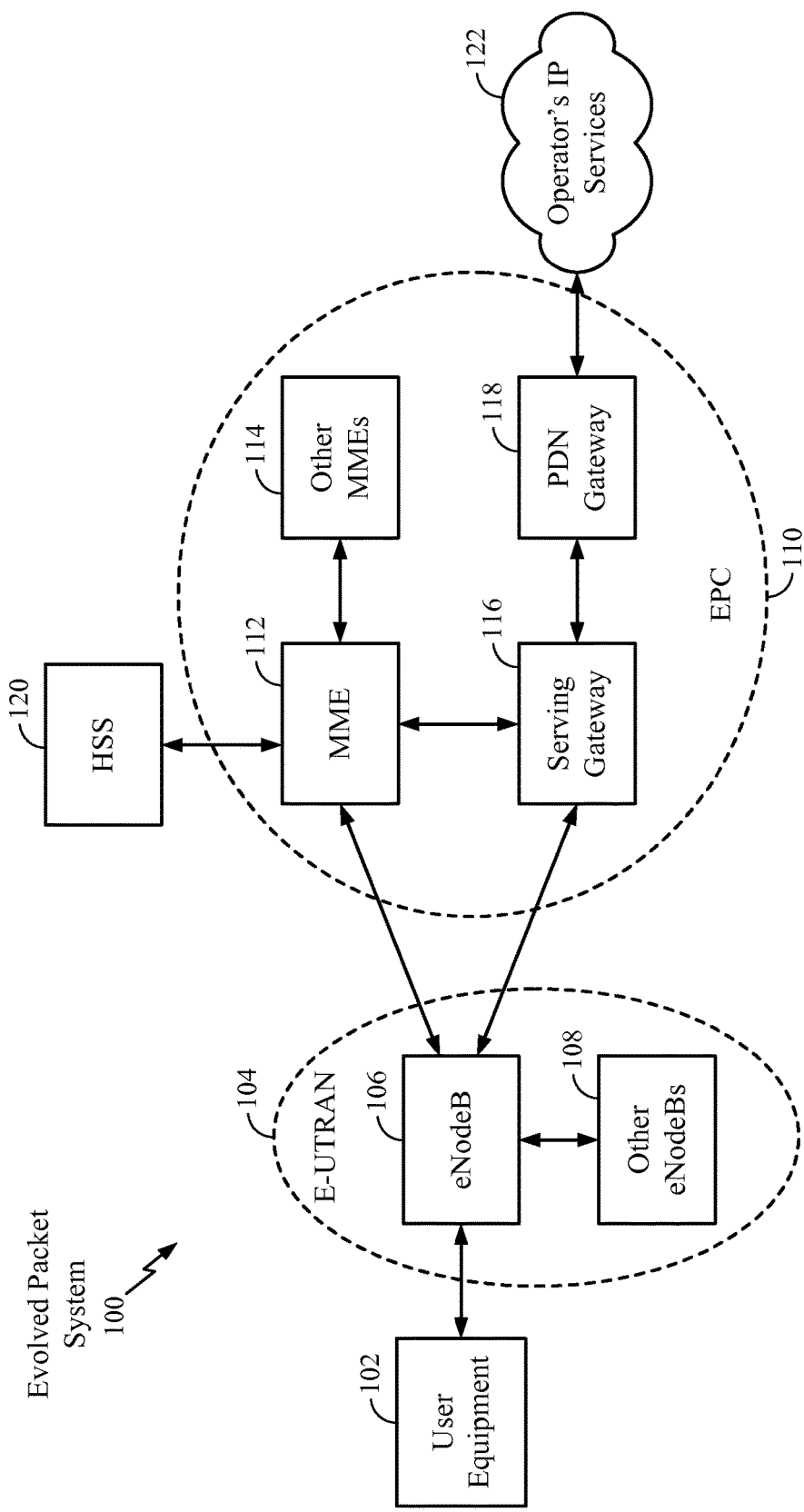
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
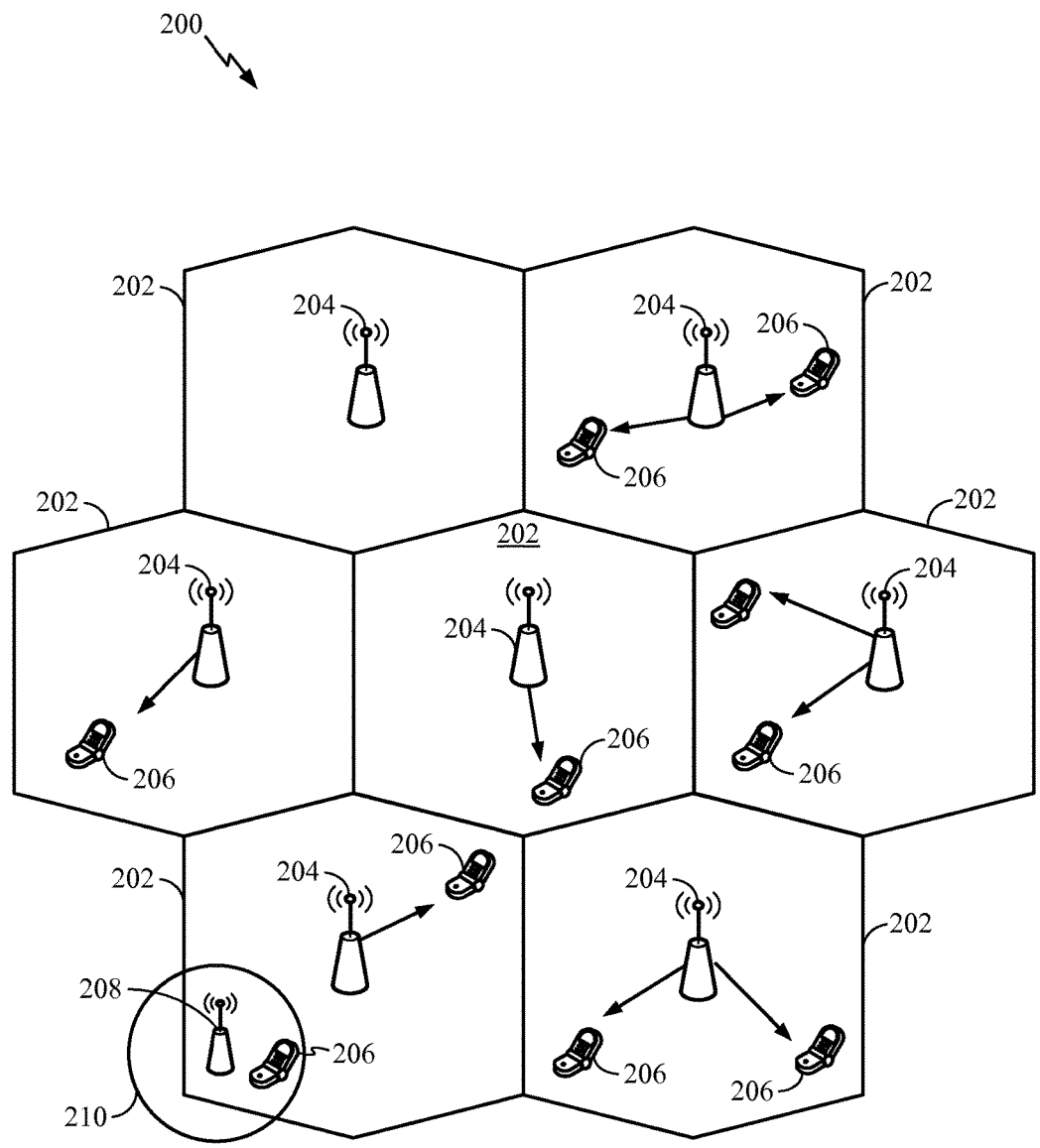
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
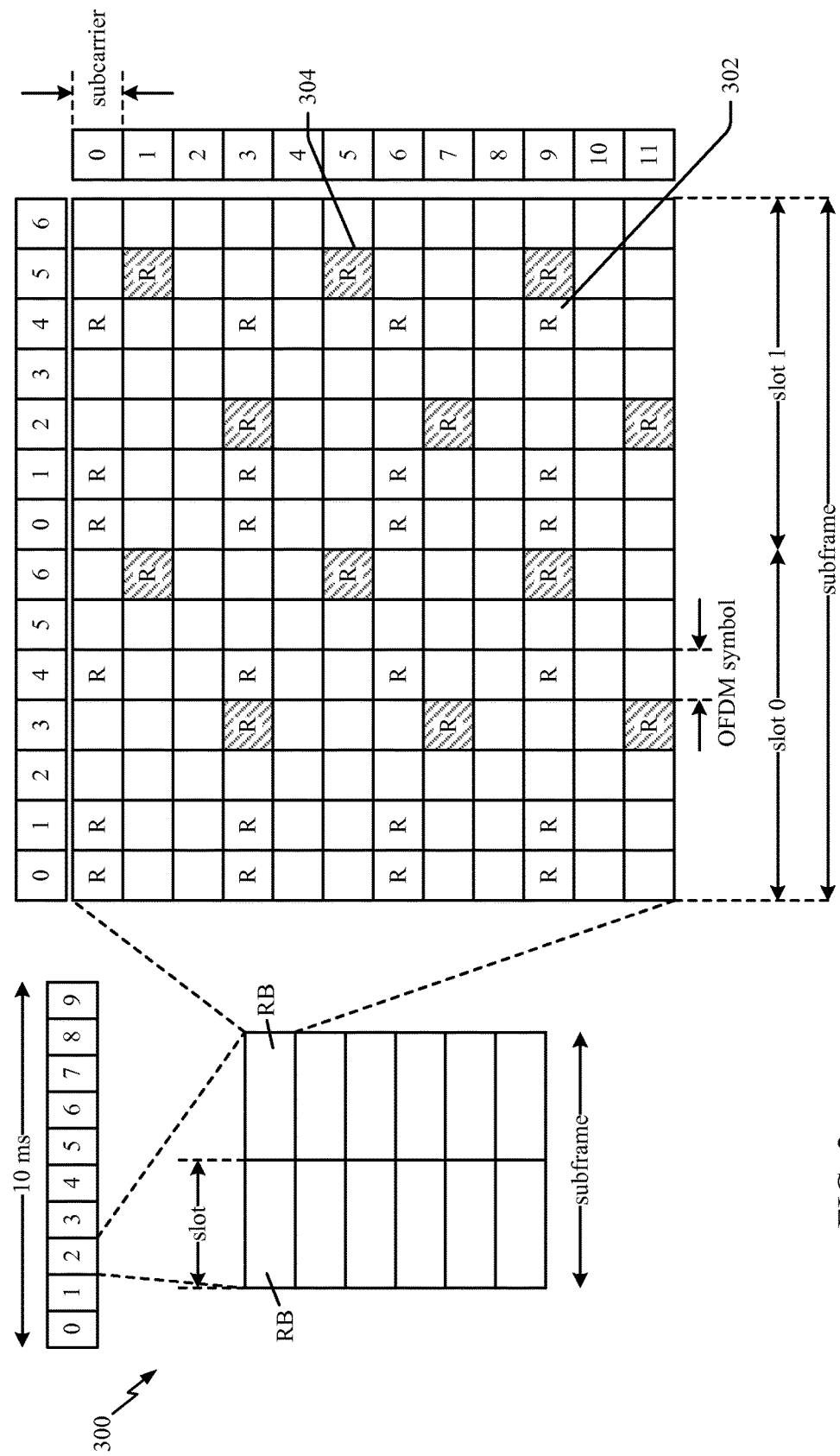
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
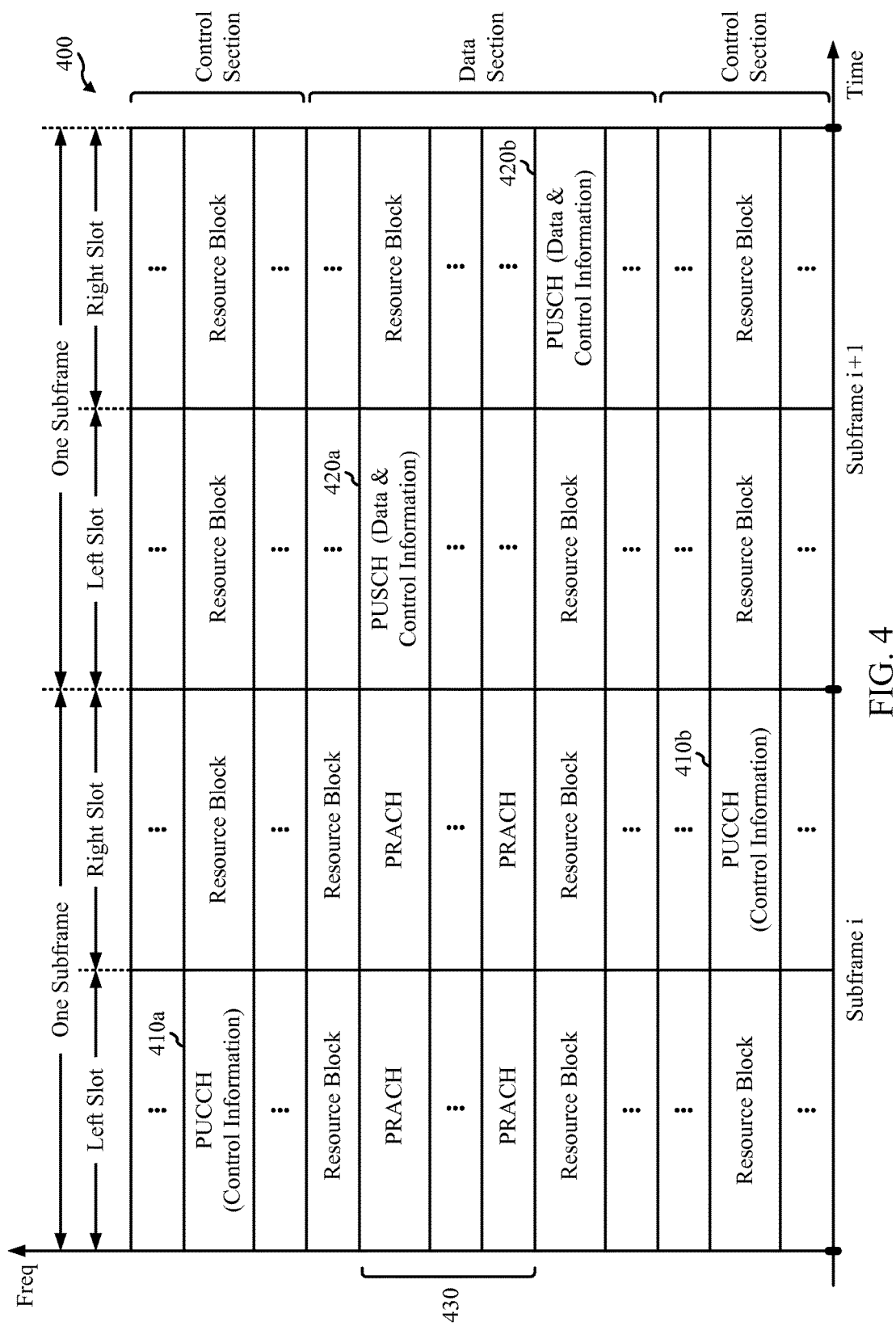
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
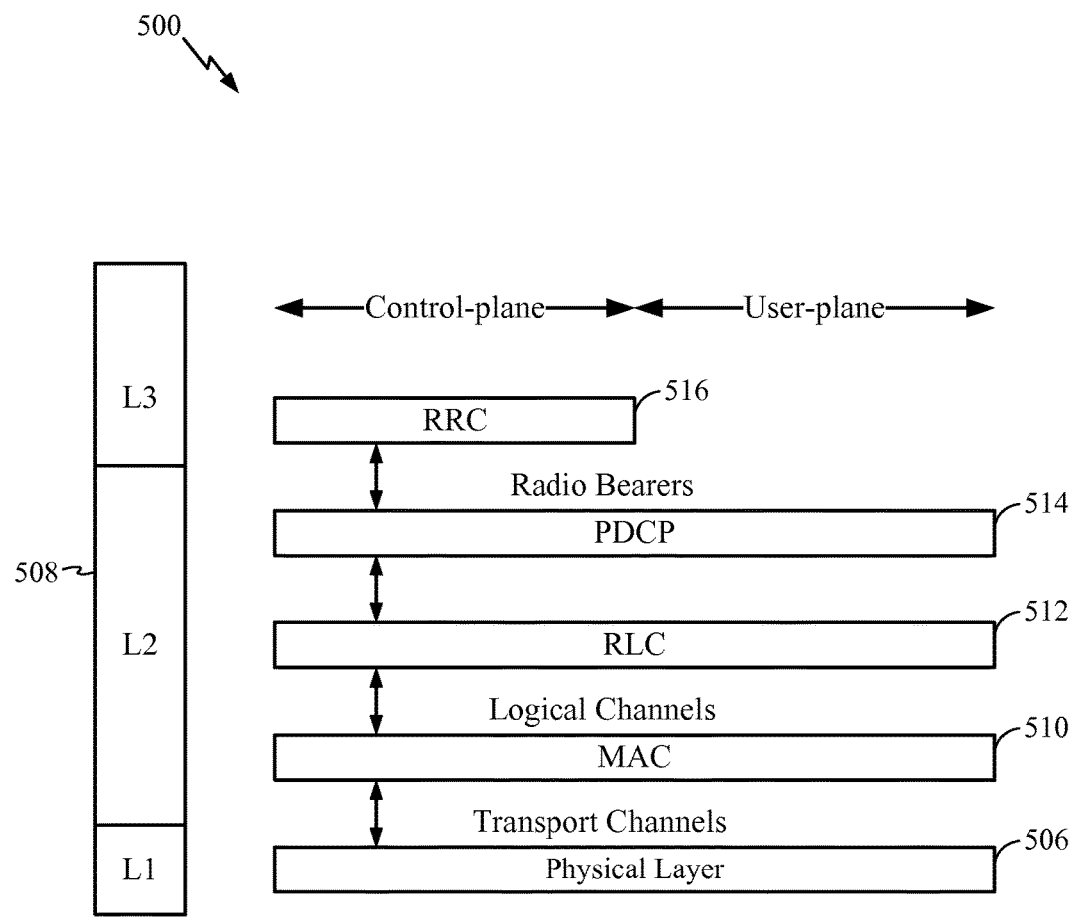
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
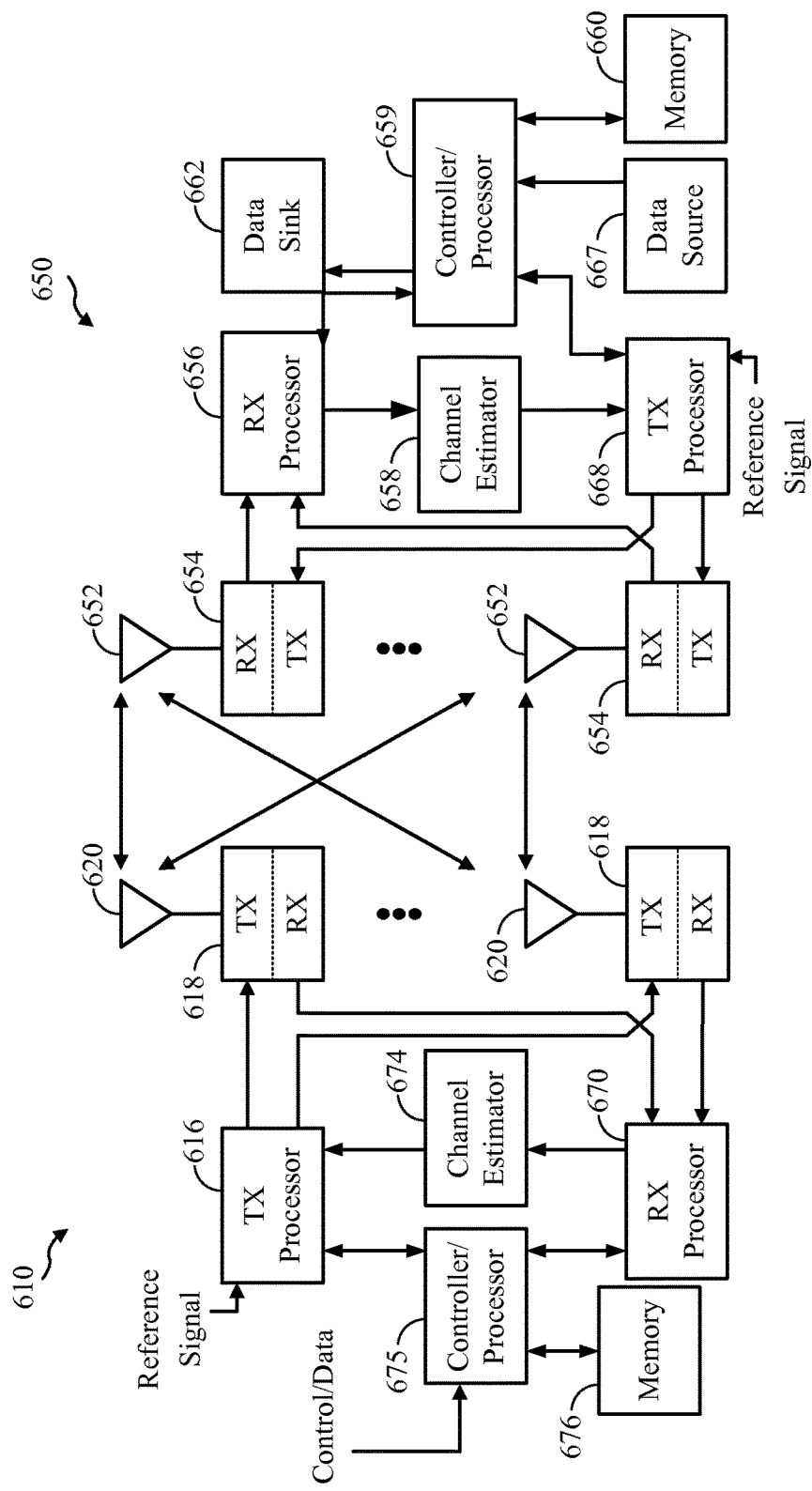
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and de-interleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
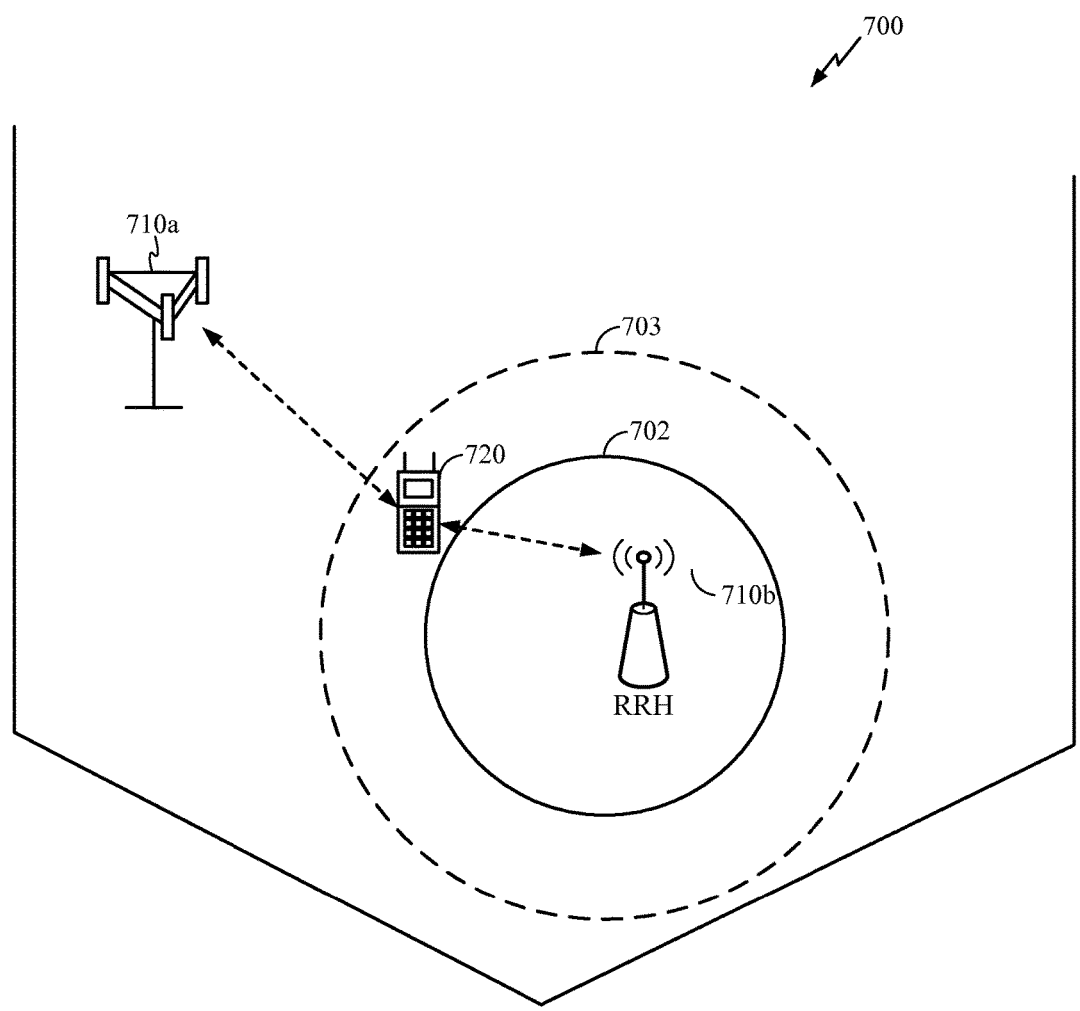
FIG. 7 is a diagram illustrating a range expanded cellular region in a heterogeneous network.

FIG. 7 is a diagram 700 illustrating a range expanded cellular region in a heterogeneous network. A lower power class eNB such as the RRH 710b may have a range expanded cellular region 703 that is expanded from the cellular region 702 through enhanced inter-cell interference coordination between the RRH 710b and the macro eNB 710a and through interference cancelation performed by the UE 720. In enhanced inter-cell interference coordination, the RRH 710b receives information from the macro eNB 710a regarding an interference condition of the UE 720. The information allows the RRH 710b to serve the UE 720 in the range expanded cellular region 703 and to accept a handoff of the UE 720 from the macro eNB 710a as the UE 720 enters the range expanded cellular region 703.

Figure 8:
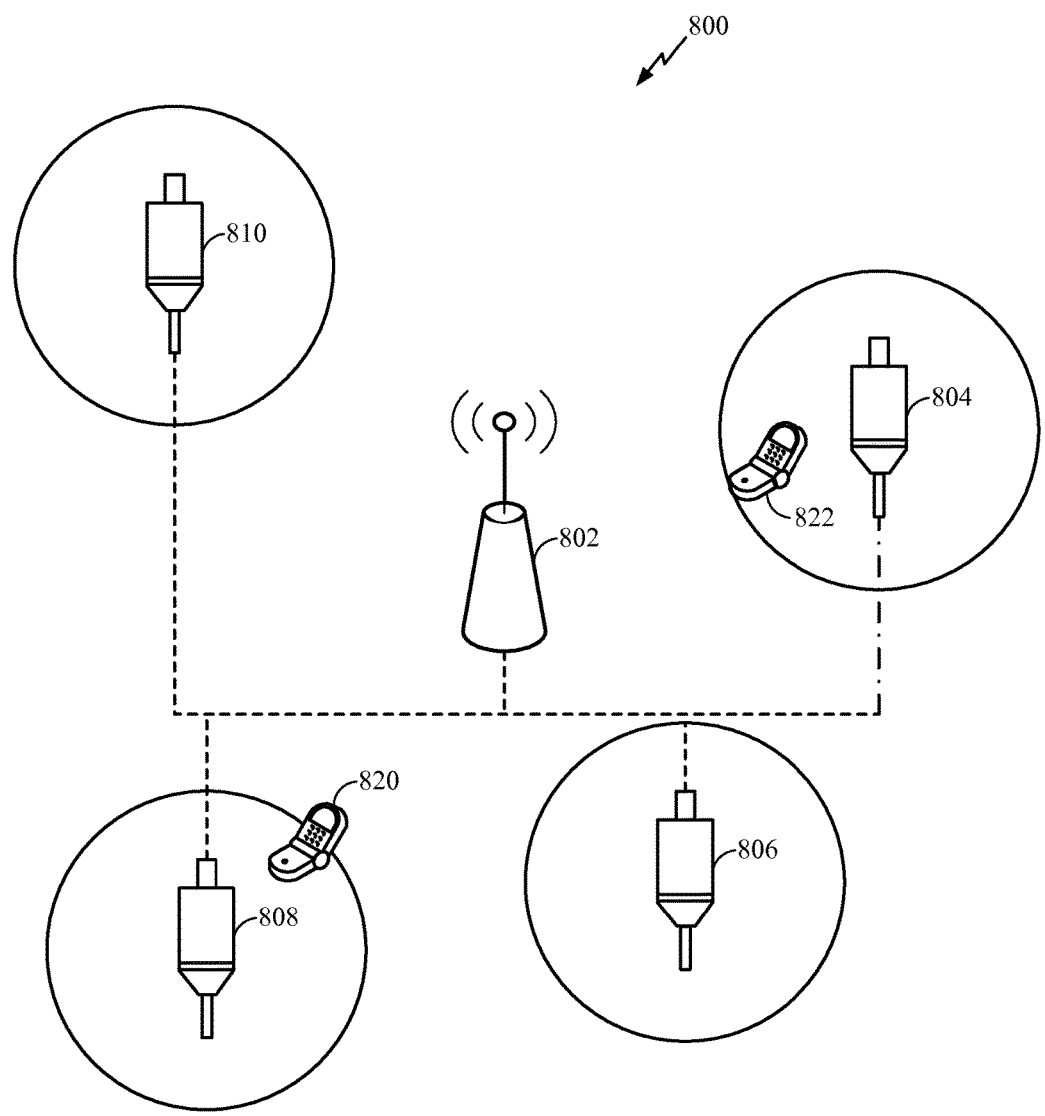
FIG. 8 is a diagram illustrating a network with a macro eNB and remote radio heads (RRHs) in accordance with certain aspects of the present disclosure.

FIG. 8 is a diagram illustrating a network 800 which includes a macro node and a number of remote radio heads (RRHs) in accordance with certain aspects of the present disclosure. The macro node 802 is connected to RRHs 804, 806, 808, 810 with optical fiber. In certain aspects, network 800 may be a homogeneous network or a heterogeneous network and the RRHs 804-810 may be low power or high power RRHs. In an aspect, the macro node 802 handles all scheduling within the cell, for itself and the RRHs. The RRHs may be configured with the same cell identifier (ID) as the macro node 802 or with different cell IDs. If the RRHs are configured with the same cell ID, the macro node 802 and the RRHs may operate as essentially one cell controlled by the macro node 802. On the other hand, if the RRHs and the macro node 802 are configured with different cell IDs, the macro node 802 and the RRHs may appear to a UE as different cells, though all control and scheduling may still remain with the macro node 802. It should further be appreciated that the processing for the macro node 802 and the RRHs 804, 806, 808, 810 may not necessarily have to reside at the macro node. It may also be performed in a centralized fashion at some other network device or entity that is connected with the macro and the RRHs.

In certain aspects, the term transmission/reception point ("TxP") typically represents geographically separated transmission/reception nodes controlled by at least one central entity (e.g., eNodeB), which may have the same or different cell IDs.

In certain aspects, when each of the RRHs share the same cell ID with the macro node 802, control information may be transmitted using CRS from the macro node 802 or both the macro node 802 and all of the RRHs. The CRS is typically transmitted from each of the transmission points using the same resource elements, and therefore the signals collide. When each of the transmission points has the same cell ID, CRS transmitted from each of the transmission points may not be differentiated. In certain aspects, when the RRHs have different cell IDs, the CRS transmitted from each of the TxPs using the same resource elements may or may not collide. Even in the case, when the RRHs have different cell IDs and the CRS collide, advanced UEs may differentiate CRS transmitted from each of the TxPs using interference cancellation techniques and advanced receiver processing.

In certain aspects, when all transmission points are configured with the same cell ID and CRS is transmitted from all transmission points, proper antenna virtualization is needed if there are an unequal number of physical antennas at the transmitting macro node and/or RRHs. That is, CRS is to be transmitted with an equal number of CRS antenna ports. For example, if the node 802 and the RRHs 804, 806, 808 each have four physical antennas and the RRH 810 has two physical antennas, a first antenna of the RRH 810 may be configured to transmit using two CRS ports and a second antenna of the RRH 810 may be configured to transmit using a different two CRS ports. Alternatively, for the same deployment, macro 802 and RRHs 804, 806, 808, may transmit only two CRS antenna ports from selected two out of the four transmit antennas per transmission point. Based on these examples, it should be appreciated that the number of antenna ports may be increased or decreased in relation to the number of physical antennas.

As discussed supra, when all transmission points are configured with the same cell ID, the macro node 802 and the RRHs 804-810 may all transmit CRS. However, if only the macro node 802 transmits CRS, outage may occur close to an RRH due to automatic gain control (AGC) issues. In such a scenario, CRS based transmission from the macro 802 may be received at low receive power while other transmissions originating from the close-by RRH may be received at much larger power. This power imbalance may lead to the aforementioned AGC issues.

In summary, typically, a difference between same/different cell ID setups relates to control and legacy issues and other potential operations relying on CRS. The scenario with different cell IDs, but colliding CRS configuration may have similarities with the same cell ID setup, which by definition has colliding CRS. The scenario with different cell IDs and colliding CRS typically has the advantage compared to the same cell ID case that system characteristics/components which depend on the cell ID (e.g., scrambling sequences, etc.) may be more easily differentiated.

The exemplary configurations are applicable to macro/RRH setups with same or different cell IDs. In the case of different cell IDs, CRS may be configured to be colliding, which may lead to a similar scenario as the same cell ID case but has the advantage that system characteristics which depend on the cell ID (e.g., scrambling sequences, etc.) may be more easily differentiated by the UE).

In certain aspects, an exemplary macro/RRH entity may provide for separation of control/data transmissions within the transmission points of this macro/RRH setup. When the cell ID is the same for each transmission point, the PDCCH may be transmitted with CRS from the macro node 802 or both the macro node 802 and the RRHs 804-810, while the PDSCH may be transmitted with CSI-RS and DM-RS from a subset of the transmission points. When the cell ID is different for some of the transmission points, PDCCH may be transmitted with CRS in each cell ID group. The CRS transmitted from each cell ID group may or may not collide. UEs may not differentiate CRS transmitted from multiple transmission points with the same cell ID, but may differentiate CRS transmitted from multiple transmission points with different cell IDs (e.g., using interference cancellation or similar techniques).

In certain aspects, in the case where all transmission points are configured with the same cell ID, the separation of control/data transmissions enables a UE transparent way of associating UEs with at least one transmission point for data transmission while transmitting control based on CRS transmissions from all the transmission points. This enables cell splitting for data transmission across different transmission points while leaving the control channel common. The term "association" above means the configuration of antenna ports for a specific UE for data transmission. This is different from the association that would be performed in the context of handover. Control may be transmitted based on CRS as discussed supra. Separating control and data may allow for a faster reconfiguration of the antenna ports that are used for a UE's data transmission compared to having to go through a handover process. In certain aspects, cross transmission point feedback may be possible by configuring a UE's antenna ports to correspond to the physical antennas of different transmission points.

In certain aspects, UE-specific reference signals enable this operation (e.g., in the context of LTE-A, Rel-10 and above). CSI-RS and DM-RS are the reference signals used in the LTE-A context. Interference estimation may be carried out based on or facilitated by CSI-RS muting. When control channels are common to all transmission points in the case of a same cell ID setup, there may be control capacity issues because PDCCH capacity may be limited. Control capacity may be enlarged by using FDM control channels. Relay PDCCH (R-PDCCH) or extensions thereof, such as an enhanced PDCCH (ePDCCH) may be used to supplement, augment, or replace the PDCCH control channel.

CSI-RS Group Definition

In general, the macro node 802 and RRHs may be assigned a subset of the CSI-RS ports. For example, if there are 8 available CSI-RS ports, the macro 802 may be assigned to transmit on CSI-RS ports 0, 1, RRH 804 may be assigned to transmit on CSI-RS ports 2, 3, RRH 806 may be assigned to transmit on CSI-RS ports 4, 5, RRH 808 may be assigned to transmit on CSI-RS ports 6, 7, and RRH 810 may not be assigned any CSI-RS ports.

Alternatively, the macro node 802 and/or the RRHs may be assigned the same CSI-RS ports. For example, the macro 802, RRH 804 and RRH 808 may be assigned to transmit on CSI-RS ports 0, 1, 2, 3, and RRH 806 and RRH 810 may be assigned to transmit on CSI-RS ports 4, 5, 6, and 7. In such a configuration, the CSI-RS from the macro 802 as well as RRHs 804, 808 would overlap and the CSI-RS from RRHs 806, 810 would overlap.

In LTE Rel-10, CSI-RS was introduced to facilitate channel feedback reporting and either 1, 2, 4, or 8 CSI-RS ports may be configured for non-zero power transmission. The concepts discussed supra may utilize the Rel-10 CSI-RS but further enhancements are possible in future releases or in related transmission systems. For example, in one aspect, the number of configurable CSI-RS ports may be increased which would enable more flexibility in configuring CSI-RS ports.

In one aspect, the concept of CSI-RS groups is considered. A CSI-RS group may be defined as a set of CSI-RS ports that is grouped together for the purpose of facilitating CSI-RS configuration, CSI feedback reporting, or any other aspects that build on the CSI-RS. Similar to the previous examples, consider the case in which there is a total of 10 CSI-RS ports. Macro 802 may be configured with CSI-RS ports 0,1, RRH 804 may be assigned CSI-RS ports 2, 3, RRH 806 may be assigned CSI-RS ports 4, 5, RRH 808 may be assigned CSI-RS ports 6, 7 and RRH 810 may be assigned CSI-RS ports 8, 9. The CSI-RS ports assigned to each transmission point may be grouped, that is, CSI-RS ports 0, 1 would form CSI-RS group 0, CSI-RS ports 2, 3 would form group 1, etc. In this way, each transmission point may be associated with a CSI-RS group which may be an embodiment of practical importance. However, as noted supra, CSI-RS groups need not be restricted to the antennas of a single transmission point; instead, they may span multiple transmission points.

In one aspect, CSI-RS ports may be enumerated consecutively, as done in the above examples. However, such numbering definition is not essential to the procedures described herein. Alternatively, the grouping may be described by configuring CSI-RS groups and enumerating CSI-RS ports within each group starting with zero. Further, CSI-RS groups may also be referred to as CSI-RS resources or CSI-RS patterns.

In another aspect, CSI-RS groups may be transmitted with different parameters, e.g., periodicity, power-level, or similar aspects. Such parameters may be common among the CSI-RS ports of a specific CSI-RS group or may be communicated to the UE for each CSI-RS group.

The CSI-RS configuration may be UE-specific. Each UE may be configured with up to a predetermined number of CSI-RS ports (e.g., 8 CSI-RS ports) and/or a predetermined number of CSI-RS groups. The UE may further receive CSI-RS transmissions from different transmission points, including but not limited to the macro and RRH nodes. For example, the UE 820 may receive CSI-RS on CSI-RS ports 0, 1 from macro 802, CSI-RS on CSI-RS ports 2, 3 from RRH 804, CSI-RS on CSI-RS ports 4, 5 from RRH 806, and CSI-RS on CSI-RS ports 6, 7 from RRH 808. Such a configuration is typically specific to the UE 820. For example, the UE 822 may also be configured with 8 CSI-RS ports and receive CSI-RS on CSI-RS ports 0, 1 from RRH 808, CSI-RS on CSI-RS ports 2, 3 from RRH 810, CSI-RS on CSI-RS ports 4, 5 from RRH 804, and CSI-RS on CSI-RS ports 6, 7 from RRH 806. Generally, for any particular UE, the CSI-RS ports may be distributed among the RRHs and the particular UE may be configured with any number of the CSI-RS ports to receive CSI-RS on those ports from RRHs configured to send on those ports to the particular UE. It should be appreciated that the concept described above goes beyond the specific numbering scheme that was used in this example. The concept of CSI-RS groups spans both numbering definitions.

As discussed supra, UEs may receive CSI-RS transmissions and may provide CSI feedback based at least in part on these CSI-RS. An issue is that the codebooks of LTE Release 10 and prior releases were designed assuming that the path loss for each of the CSI-RS ports is equal and may therefore suffer some performance loss if this condition is not satisfied. Because multiple RRHs may be transmitting data with CSI-RS, the path loss associated with each of the CSI-RS may be different. As such, codebook refinements may be needed to enable cross transmission point CSI feedback that takes into account the proper path losses to TxPs. Multiple CSI feedback may be provided by grouping antenna ports and providing feedback per group.

The UE may provide CSI feedback based on its CSI-RS configuration which may include PMI/RI/CQI. The codebook design may assume that the antennas are not geographically separated, and therefore that there is the same path loss from the antenna array to the UE. This is not the case for multiple RRHs, as the antennas are uncorrelated and see different channels. Codebook refinements may enable more efficient cross TxP CSI feedback. CSI estimation may capture the path loss difference between the antenna ports associated with different TxPs.

CSI-RS Based Selection and Reporting of Transmission Points

In macro/RRH setups, CSI-RS and DM-RS may be used to decouple control and data transmission. Data transmission (e.g. for LTE Rel 10 and beyond) may be based on CSI-RS and DM-RS, while control may be received from a possibly different set of transmission points via CRS. Traditionally, selection of transmission points for data transmission is based on monitoring CRS. In such a setup CSI-RS configuration may follow UE reporting of RSRP, RSRQ or other metrics based on CRS. However, due to decoupling of control and data transmission, the CRS may not be available for selecting transmission points for data transmission. Therefore, a need exists for an alternative to CRS based configuration of data-serving transmission points.

Certain aspects of the present disclosure introduce a reporting framework (e.g., in LTE Rel-11), in which this can be carried out based on CSI-RS. In certain aspects, the new concept of CSI-RS groups, i.e., a set of CSI-RS ports of a UE that a UE considers as one group for PMI/CQI/RI reporting, may be defined. Specifically, a UE may consider a group by itself and perform reporting (e.g., similar to Rel-10 CSI reporting in TM9), except that it may disregard all CSI-RS outside a specific CSI-RS group. Details of how the reporting/signaling and configuration of CSI-RS groups may be performed are discussed herein. The concepts described herein may be applicable to both macro/RRH setups with same or different cell ID.

Configuration of CSI-RS Groups

FIG. 9 is a diagram illustrating CSI-RS groups corresponding to different transmission points in accordance with certain aspects of the present disclosure. Network 900 includes macro eNB 902 with a coverage area 920, and RRHs 904, 906, 908 and 910 with respective coverage areas 912, 914, 916 and 918. In certain aspects each CSI-RS group may correspond to the antennas of a different macro/RRH transmission points. For example, as shown in FIG. 9, CSI-RS group 0 corresponds to macro eNB 902, CSI-RS group 1 corresponds to RRH 908, CSI-RS group 2 corresponds to RRH 906, CSI-RS group 3 corresponds to RRH 910 and CSI-RS group 4 corresponds to RRH 904.

FIG. 10 is a diagram illustrating CSI-RS groups in which multiple cells/TxPs form each CSI-RS group in accordance with certain aspects of the present disclosure. In FIG. 10, CSI-RS groups are configured to include antennas from multiple cells. For example, as shown, CSI-RS group 0 corresponds to macro eNB 902, CSI-RS group 1 corresponds to antennas of RRHs 908 and 910. Similarly, CSI-RS group 2 corresponds to antennas of RRHs 904 and 906.

According to certain aspects, not shown herein, the CSI-RS group configurations may include partial assignments of antennas from different transmission points. CSI-RS groups may also be configured in an overlapping fashion. For example, in the FIG. 10, the RRH 910 may be part of both the group 1 and group 2 CSI-RS groups (not shown in the figure). In certain aspects, CSI-RS group configuration may be made known to the UE, e.g., together with the CSI-RS port/pattern configuration. According to certain aspects, being able to assign same scrambling IDs across different cells may be beneficial for the different cell ID cases. According to other aspects, different scrambling IDs may be assigned to each CSI-RS group, even if the CSI-RS groups have the same cell ID.

In certain aspects, overlapping CSI-RS groups may be configured for different RRHs, e.g., according to the intended CoMP transmission configuration to allow more accurate SINR measurements. Beamforming on some CSI-RS ports may be part of this configuration to facilitate more accurate rate prediction (e.g., CQI feedback). A UE may measure channel from its CSI-RS ports and the transmission from other overlapping CSI-RS transmissions would be interference. This enables UEs to measure channel state conditions and interference on a resource specific basis. In such case, the CSI-RS may be regarded as a resource quality indication reference signal (RQI-RS). Alternately, in another design, the UE may report based on several different sets of CSI-RS groups and the eNB may perform rate prediction based on these reports by extrapolation.

In certain aspects, CSI-RS reporting by the UE may not take into account different transmit power levels of macro and RRH. The eNB may have to take this into account, especially when performing joint transmission, i.e., the final CQI may need to be adjusted accordingly in case a joint transmission takes place from both macro and RRH. In an aspect, CSI-RS grouping may be according to the power class of nodes (e.g., macro and RRH nodes, pico nodes, femto, etc.). Grouping according to the power class of nodes may facilitate taking into account the different power levels of macro and RRH, respectively, for reporting and scheduling.

Extending CSI Reporting Modes to Reflect CSI-RS Groups

In certain aspects, CSI-RS groups may be viewed as an additional "dimension" of a UE's CSI reporting. In a first aspect, reporting may decouple CSI-RS group specific reporting from the CSI reporting's other dimensions (e.g., frequency-domain subband cycling, etc.). In a second aspect, reporting may be done jointly across these different dimensions. Both these aspects are further described herein.

Referring to the first aspect, described above, CSI-RS group specific reporting may not be "mixed" with existing dimensions. UEs may report PMI/CQI/RI for different CSI-RS groups separately (i.e., the way PMI/CQI/RI is reported within a CSI-RS group is not changed). Two reporting strategies are described herein with respect to the first aspect. First, eNBs may configure predefined cycling through CSI-RS groups. Second, UEs may report the best-$N_G$ CSI-RS groups. Either of the above two reporting strategies may be incorporated into the existing CSI reporting modes, both aperiodic and periodic.

For periodic reporting, the cycling may be incorporated, for example, into the existing PUCCH 2-1 reporting modes, which currently has cycling across bandwidth parts. The selection and reporting of the best-$N_G$ CSI-RS groups may follow a reporting approach similar to current PUCCH 2-1 or PUSCH 2-2. For aperiodic reporting, payload could be increased to accommodate the CSI report from multiple CSI-RS groups. This may be an option especially for those modes that carry relatively little payload today.

Referring to the second alternative, joint reporting across different dimensions, certain aspects consider CSI-RS groups as another dimension for augmenting CSI-RS modes. In an aspect, a UE may report the best-M subbands from a selected set of CSI-RS groups. For instance, a UE may report sub-band SB1 for the first CSI-RS group and SB2 for a second CSI-RS group, depending on channel condition. This may be incorporated into the existing reporting modes by adding an indicator that the UE could use to indicate the reported CSI-RS group. For example, this indicator may be an index or bitmap linking the radio resource control (RRC) configuration of the CSI-RS group to the CSI-RS configuration.

Figure 12:
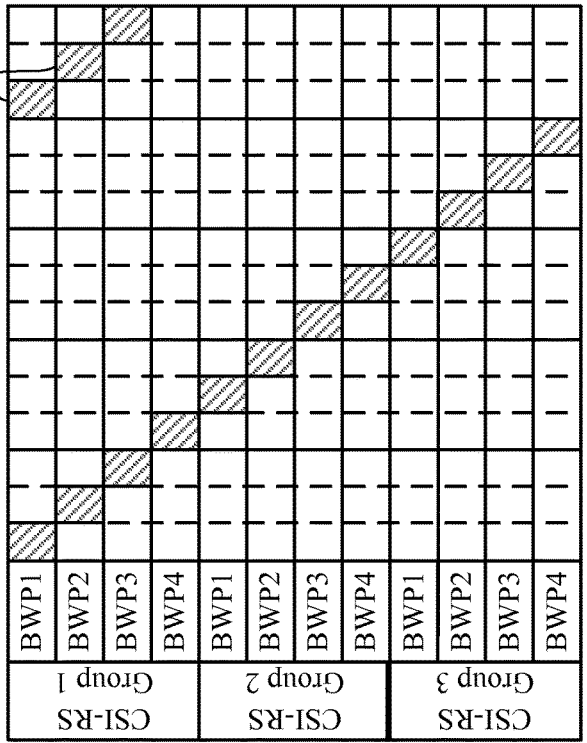
FIG. 12 is a diagram illustrating predefined cycling in two dimensions, first across BWPs, then across CSI-RS groups in accordance with certain aspects of the present disclosure.
Figure 11:
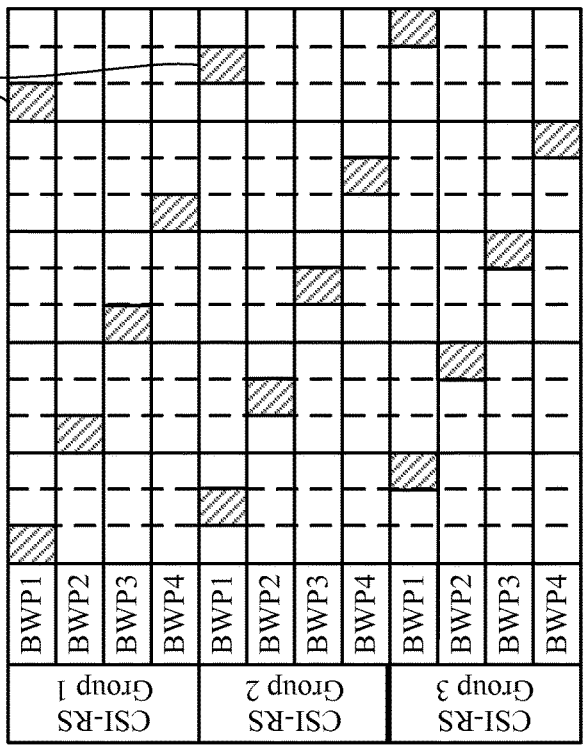
FIG. 11 is a diagram illustrating predefined cycling in two dimensions, first across CSI-RS groups, then across bandwidth parts (BWPs) in accordance with certain aspects of the present disclosure.

In certain aspects, it is also possible to have some predefined cycling pattern for reporting the CSI-RS groups. FIGS. 11-12 illustrate examples of different cycling patterns. The figures show CSI-RS Groups 1, 2 and 3 with each CSI-RS group including four bandwidth parts BWP1, BWP2, BWP3 and BWP4. The shaded squares 1102, 1202 denote reporting instances.

The example predefined cycling pattern of FIG. 11 cycles across a subset of the CSI-RS groups first, and then in a second step cycles across the bandwidth. For instance, a UE reports BWP1 of CSI-RS Group 1 followed by BWP1 of CSI-RS Group 2, etc. until all groups are reported, and then in another cycle reports BWP2 of all the Groups, and so on.

The example predefined cycling pattern of FIG. 12 cycles across BWPs of the CSI-RS Group 1 first, and then cycles across the BWPs of other CSI-RS Groups 2, 3 and 4.

Many other combinations may be possible. In an aspect, a frequency granularity other than a bandwidth part may be chosen (e.g., a subband or some other granularity). As well, UE selection based reporting may be incorporated into the above framework.

In certain aspects, signaling of codebooks to use per CSI-RS group (or for different CSI-RS group combinations as described later on) may be beneficial, especially if codebook enhancements are defined as part of LTE Rel-11 or beyond. In an aspect, the concepts described herein may rely on the existing 2Tx, 4Tx, 8Tx codebooks. Enhanced codebooks or inter-cell feedback may be introduced in later releases (e.g., Rel-11 and later). Such codebooks may readily leverage the CSI-RS group concepts described herein. The reporting based on different CSI-RS groups may be linked to different codebook sets, either implicitly or explicitly. Codebook sets may encompass existing Rel-10 codebooks as well as new codebooks potentially defined in later releases.

The CSI-RS group based reporting has the benefit that interference estimation may implicitly be made part of the PMI/CQI/RI report (i.e., assumptions on interference estimation may be made consistent with assumptions on the CSI-RS group configuration). According to certain aspects, CRS based reporting may be potentially considered as a "virtual" CSI-RS group and a UE may provide feedback consistent with this assumption to provide additional information to the eNodeB.

Certain aspects may exploit subframe specific CSI-RS group configuration based on subframe-specific reporting concept of Rel-10 eICIC. This concept may be exploited to have different CSI-RS group configurations in different subframes. For example, CSI grouping 1 for subframe set 1; another possible CSI grouping 2 for subframe set 2; and possibly another definition for the complementary set (as currently defined as part of Rel-10). This may also leverage existing reporting concepts, although extensions may be considered. This may be used for heterogeneous networks, similar to the way CQI is reported for conventional HetNet. Further, this may be advantageous if a UE is served (transparently) by different transmission points in different subframes).

According to certain aspects, an eNodeB may restrict reporting to a subset of CSI-RS groups, similar to codebook subset restriction, throughout all the above concepts.

Certain aspects may limit reporting payload if multiple CSI-RS groups are reported together. The set S (as defined in LTE specifications) may be the same for all CSI-RS groups but the configuration of the set S may be such that it cycles over subband or bandwidth parts (and over time therefore cycles across the entire bandwidth). The set S may be different across CSI-RS groups and, for example, may be mutually orthogonal to each other or overlapped. It may cover the entire bandwidth across all groups.

Certain aspects may relate to differential feedback encoding. For example, CQI (and CSI information in general) may be encoded differentially. This is especially useful if CSI-RS groups overlap, leading to correlation among CSI reports for different group. This correlation may be exploited to reduce uplink feedback overhead, e.g., in a similar manner as the differential CQI encoding employed in Rel-10.

The above description considered the introduction of CSI-RS groups into the existing CSI reporting framework (e.g. Rel-10 CSI reporting framework). In certain aspects, CSI-RS groups may be used to support explicit feedback reporting. For example, explicit feedback of the dominant eigen-direction and/or eigen-values associated with MIMO streams of different CSI-RS groups may be considered. In an aspect, UEs may consider combining different CSI-RS groups and provide feedback based on the combined CSI-RS ports of the aggregated groups. For example, if groups consist of 2 CSI-RS ports each, then a UE may provide feedback of 2 aggregated groups (thus 4 CSI-RS ports total), or 4 aggregated CSI-RS groups (8 CSI-RS ports total). Feedback computation may be based on available codebooks for the resulting number of CSI-RS ports.

The aggregation of groups may have different performance. The UE may pick a good configuration and provide an indication of which aggregation should be used. Conceptually, this may be similar to the rank-indicator; and may be referred to as "CSI-RS group selection indicator."

When aggregating multiple CSI-RS groups, a UE may need to make assumptions on the relative phases between these CSI-RS groups as this may impact the performance of the aggregated CSI-RS configuration. Various assumptions may be made by the UE. In one aspect, the UE may assume that the phase relationship between the CSI-RS groups considered for aggregation is determined by the phase relationship observed between the CSI-RS groups. In another aspect, a specific phase relationship may be assumed by the UE. This relationship may be signaled to the UE as part of the CSI-RS configuration or feedback reporting configuration. In yet another aspect, the UE may perform averaging across different phase relationships between the CSI-RS groups. Additional signaling may support this operation by providing details on how the averaging is to be performed.

Signaling and Triggering CSI-RS Group Reports

In certain aspects, as part of configuring CSI-RS groups, CSI-RS grouping may be made part of the CSI-RS and muting configuration and be signaled semi-statically.

In certain aspects, as part of triggering CSI reports belonging to certain CSI-RS groups, an eNB may dynamically signal a reference indicating which CSI-RS group to use for reporting (that reference could e.g. point to the RRC-based CSI-RS configuration). A bitmask may be used in the grant to select multiple CSI-RS groups for reporting at the same time. In an aspect, aperiodic triggering may be similar to the way aperiodic SRS is triggered in Rel-10. For periodic reporting, eNodeB may configure the reporting techniques discussed previously through signaling to the UE.

In certain aspects, CSI-RS group indication made by the UE may be similar to rank indicator as previously discussed and may be used to cut back on signaling overhead. For example, an eNB may exploit 1-bit signaling, indicating whether or not it is following the UE's CSI-RS group indication. If the eNB decides not to follow the UE's suggestion, the bitmask-based signaling mentioned above (or a variation thereof) may be needed.

Figure 13:
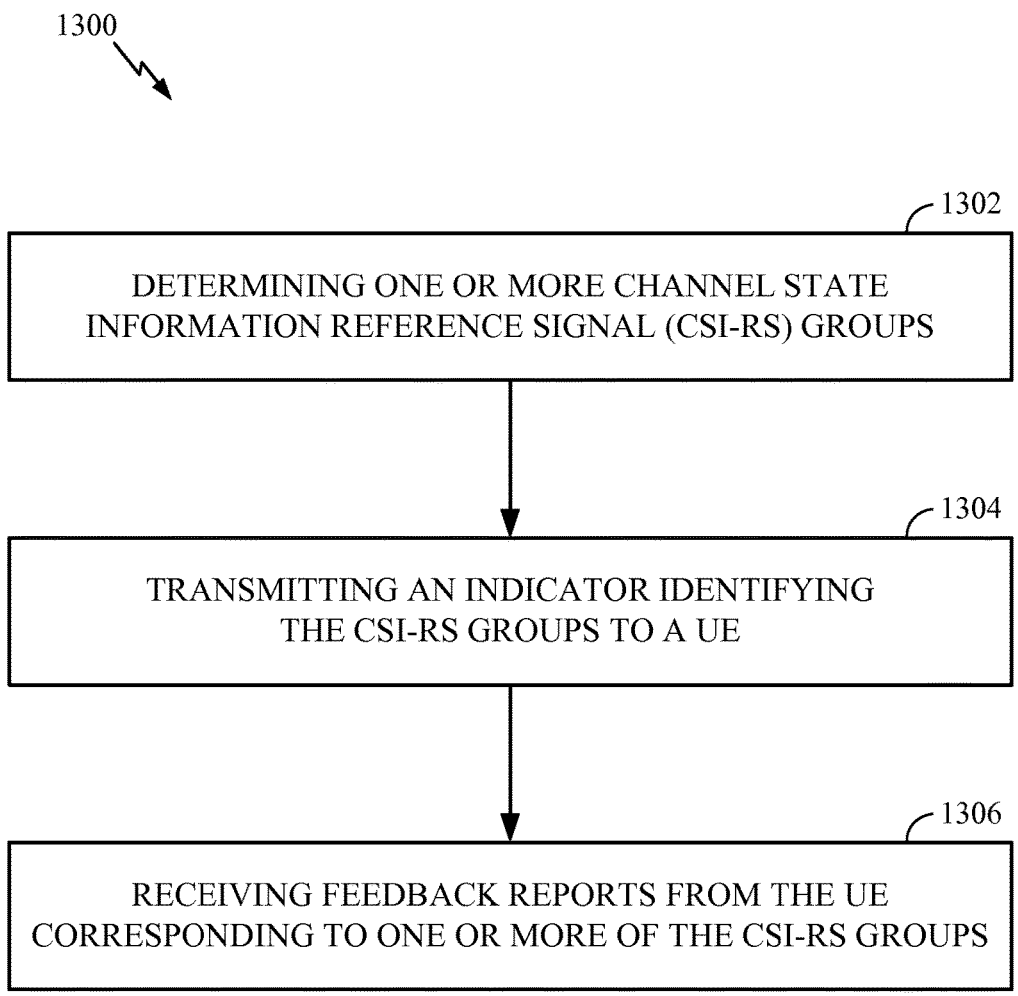
FIG. 13 is a diagram illustrating example operations performed, for example by a transmitter, in accordance with certain aspects of the present disclosure.
Figure 13A:
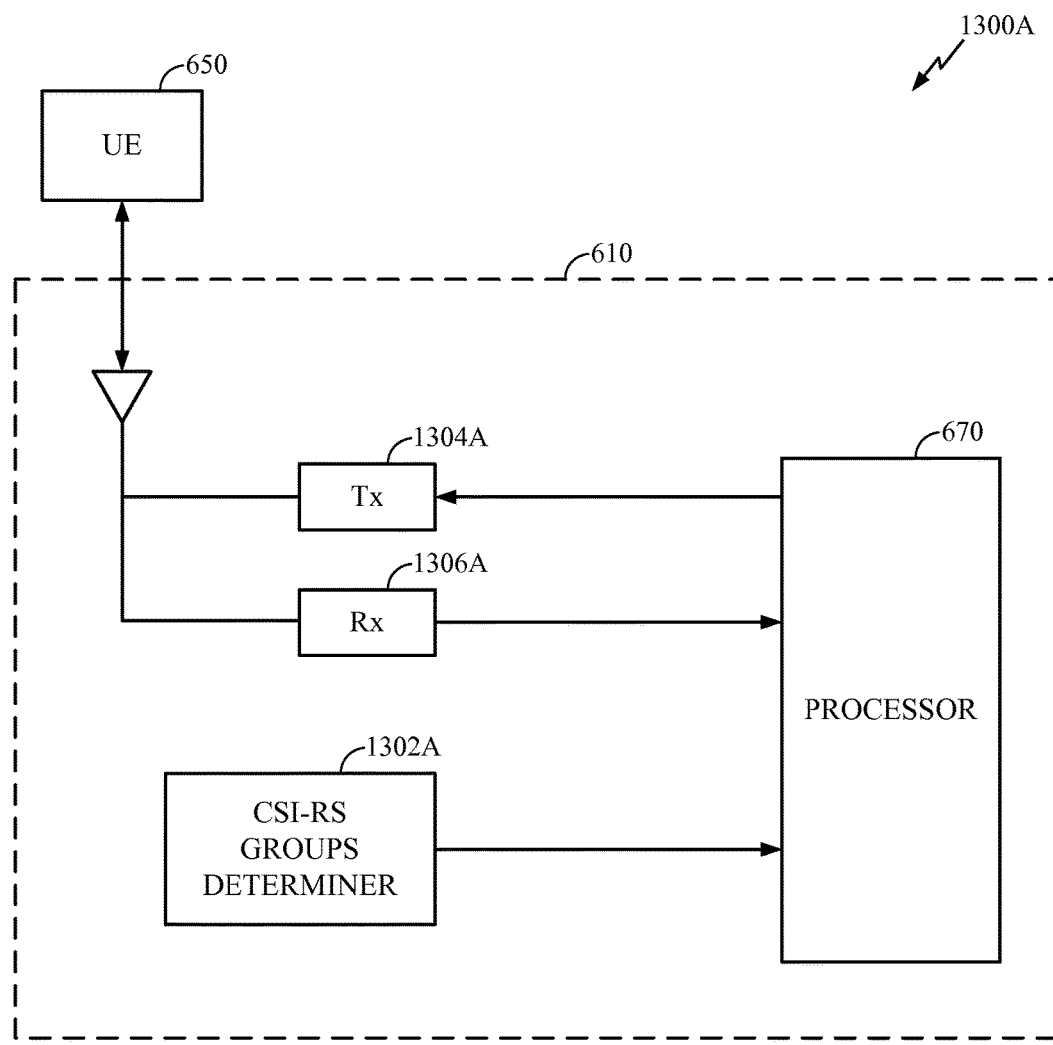
FIG. 13A illustrates example components capable of performing the operations illustrated in FIG. 13 in accordance with certain aspects of the present disclosure.

FIG. 13 illustrates example operations 1300 performed, for example, by a transmitter, in a system comprising a macro node and at least one remote radio head (RRH) entity, in accordance with certain aspects of the present disclosure. Operations 1300 may be executed, for example at processor(s) 616 and/or 675 of the eNB 610.

Operations 1300 may begin at 1302 by determining one or more CSI-RS groups for feedback reporting by a UE (e.g. UE 820). For example, as discussed with reference to FIGS. 9 and 10, each CSI-RS group may correspond to antennas of a different TxP or may be configured to include antennas from multiple TxPs.

At 1304, an indicator identifying the one or more CSI-RS groups may be transmitted to the UE. The UE may use the received indicator to determine the CSI-RS groups and provide feedback to an eNB (e.g. macro node 802) for one or more CSI-RS groups.

At 1306, feedback reports may be received at an eNB from the UE corresponding to one or more of the CSI-RS groups. As discussed above, a UE may either report the best-$N_G$ CSI-RS groups, cycle across the CSI-RS groups one by one, or perform reporting of the CSI-RS groups in accordance with the above description.

The operations 1300 described above may be performed by any suitable components or other means capable of performing the corresponding functions of FIG. 13. For example, operations 1300 illustrated in FIG. 13 correspond to components 1300A illustrated in FIG. 1300A. In FIG. 1300A, a CSI-RS groups determiner 1302A may determine one or more CSI-RS groups. A transmitter 1304A may transmit an indicator identifying the CSI-RS groups, and a receiver 1306A may receive feedback reports from a UE 650 corresponding to the one or more CSI-RS groups. The received feedback reports may be processed in a processor 670 at eNB 610.

Figure 14:
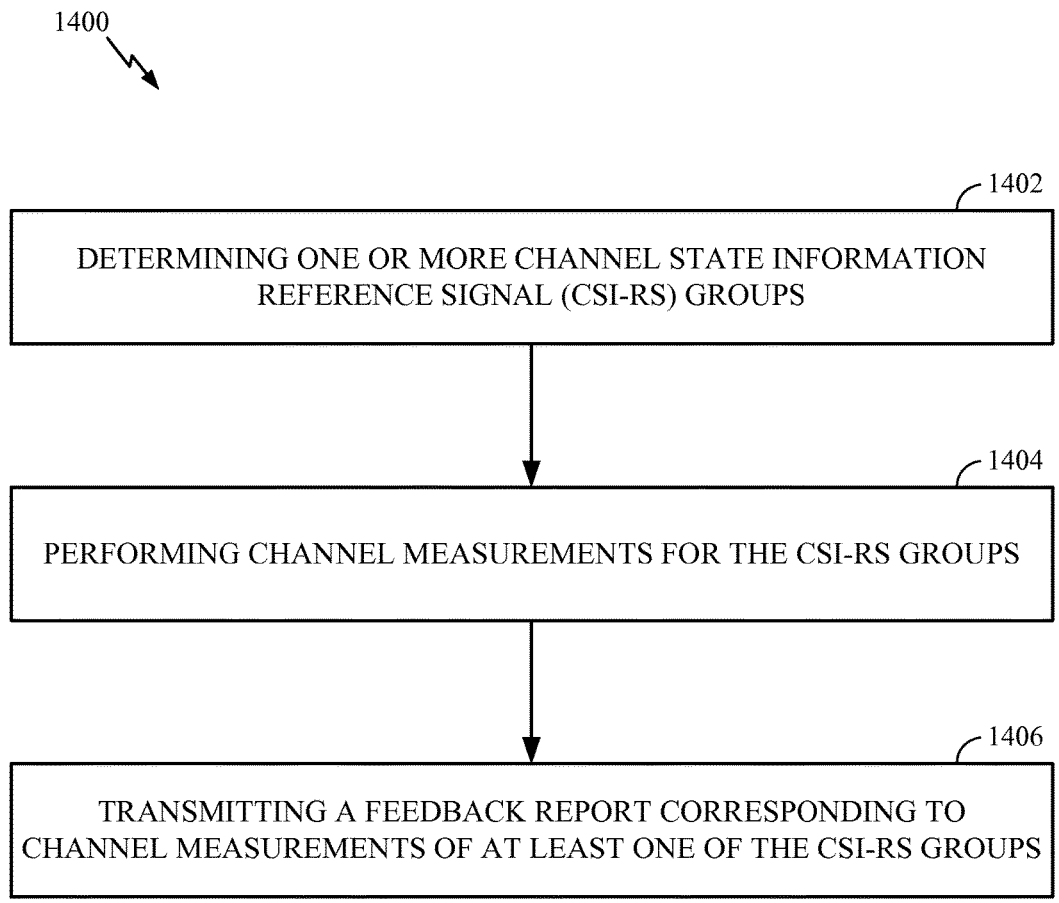
FIG. 14 is a diagram illustrating example operations performed, for example by a UE. in accordance with certain aspects of the present disclosure.
Figure 14A:
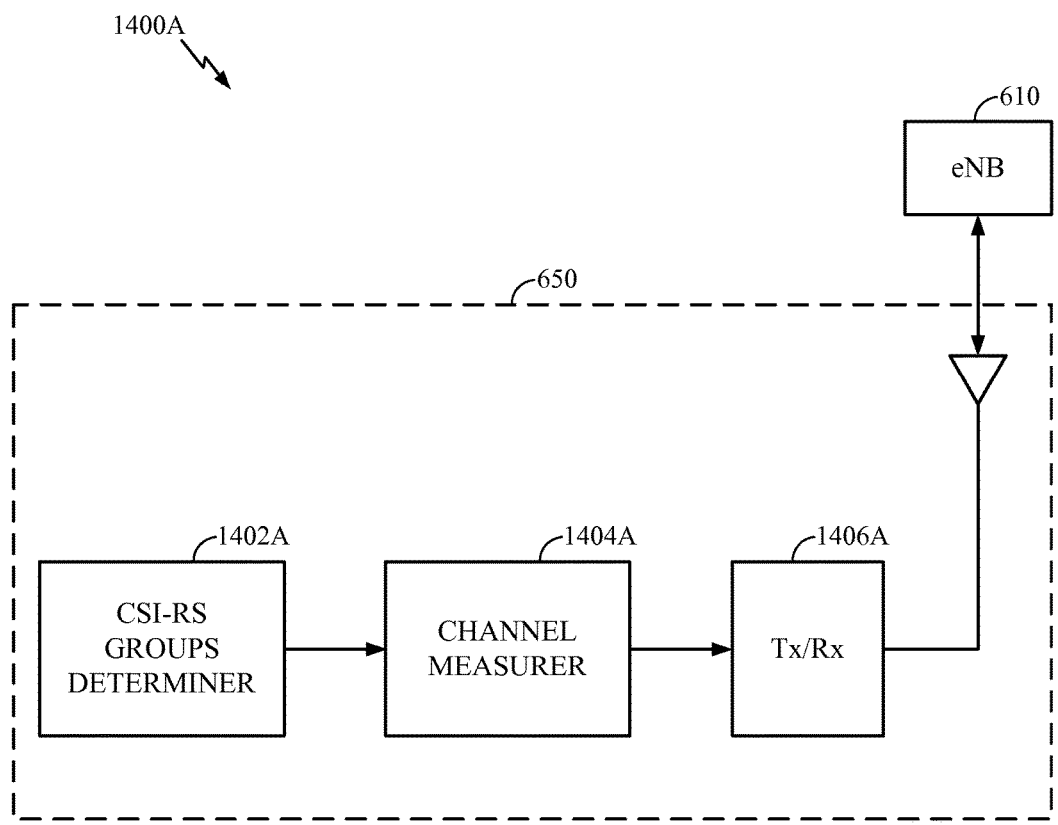
FIG. 14A illustrates example components capable of performing the operations illustrated in FIG. 14 in accordance with certain aspects of the present disclosure.

FIG. 14 illustrates example operations 1400 performed, for example, by a UE, in a system comprising a macro node and at least one remote radio head (RRH) entity, in accordance with certain aspects of the present disclosure. Operations 1400 may be executed, for example at processor(s) 656 and/or 658 of UE 650.

Operations 1400 may begin at 1402 by determining one or more CSI-RS groups that a UE groups for feedback reporting. For example, as discussed with reference to FIGS. 9 and 10, each CSI-RS group may correspond to antennas of a different TxP or may be configured to include antennas from multiple TxPs.

At 1404, the UE may perform channel measurements for the CSI-RS groups. For example, the UE may measure a channel from the CSI-RS ports of one or more CSI-RS groups.

At 1406, feedback reports corresponding to channel measurements of at least one of the CSI-RS groups may be transmitted to a macro node (e.g. macro node 802). As discussed above, a UE may either report the best-$N_G$ CSI-RS groups, cycle across the CSI-RS groups one by one or perform reporting of the CSI-RS groups in accordance with the above description.

The operations 1400 described above may be performed by any suitable components or other means capable of performing the corresponding functions of FIG. 14. For example, operations 1400 illustrated in FIG. 14 correspond to components 1400A illustrated in FIG. 1400A. In FIG. 1400A, a CSI-RS groups determiner 1402A may determine one or more CSI-RS groups. A channel measurer 1404A may measure channel for the CSI-RS groups. Finally, a transceiver (TX/RX) 1406A may transmit feedback reports to an eNB 610 for the CSI-RS groups.

Figure 15:
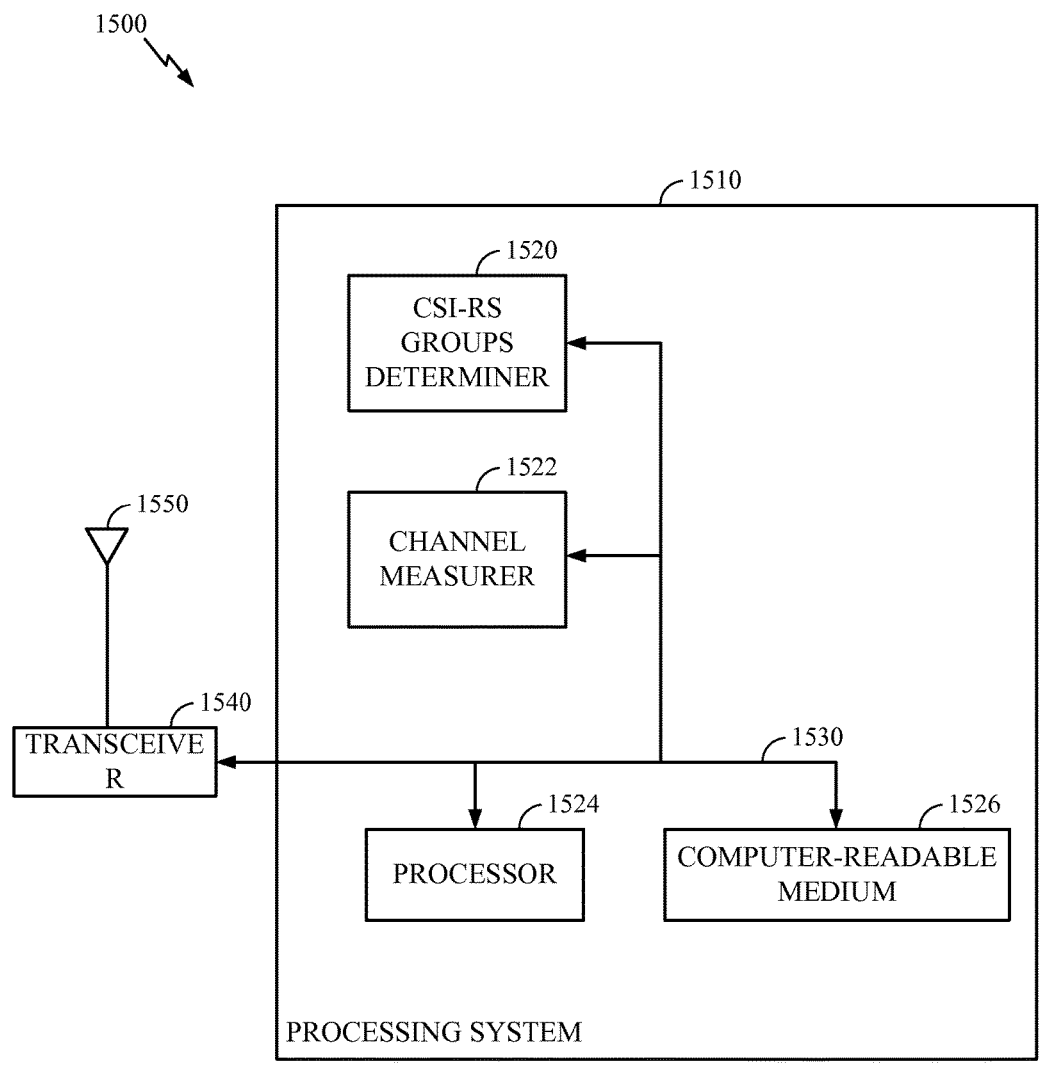
FIG. 15 is a diagram illustrating an example of a hardware implementation for an apparatus employing a processing in accordance with certain aspects of the present disclosure.

FIG. 15 is a diagram illustrating an example of a hardware implementation for an apparatus 1500 employing a processing system 1510. The processing system 1510 may be implemented with a bus architecture, represented generally by the bus 1530. The bus 1530 may include any number of interconnecting buses and bridges depending on the specific application of the processing system 1510 and the overall design constraints. The bus 1530 links together various circuits including one or more processors and/or hardware modules, represented by the processor 1524, the modules 1520, 1522, and the computer-readable medium 1526. The bus 1530 may also link various other circuits such as timing sources, peripherals, voltage regulators, and power management circuits, which are well known in the art, and therefore, will not be described any further.

The processing system 1510 is coupled to a transceiver 1540. The transceiver 1540 is coupled to one or more antennas 1550. The transceiver 1540 provides a means for communicating with various other apparatus over a transmission medium. The processing system 1510 includes a processor 1524 coupled to a computer-readable medium 1526. The processor 1524 is responsible for general processing, including the execution of software stored on the computer-readable medium 1526. The software, when executed by the processor 1524, causes the processing system 1510 to perform the various functions described supra for any particular apparatus. The computer-readable medium 1526 may also be used for storing data that is manipulated by the processor 1524 when executing software. The processing system further includes modules 1520 and 1522. The modules may be software modules running in the processor 1524, resident/stored in the computer readable medium 1526, one or more hardware modules coupled to the processor 1524, or some combination thereof. The processing system 1510 may be a component of the UE 650 and may include the memory 660 and/or at least one of the TX processor 668, the RX processor 656, and the controller/processor 659.

Enhancing Codebook Design for Geographically Separated Antennas

With the MIMO codebooks defined in LTE, only co-located antennas may be addressed efficiently, since the codebooks assume that all transmit antennas' signals are received with the same (long term) average power. In addition to the aspects and methods discussed supra, one may consider enhanced codebooks which may include codebook entries addressing multiple separate groups of antennas. This is a straightforward extension of Rel-8/9/10 closed loop feedback. However, it may likely require new codebook design for adequate performance. For example, precoder subsets with "antenna turn off" may enable fast cell selection.

In yet another aspect, related to the concepts discussed earlier, the UE may report independent RI and PMI for two or more configured CSI-RS groups. In addition, the UE may also report an explicit index indicating which antenna group is addressed by additional subband CQI information. For example, separate CSI-RS group specific wideband RI/PMI/CQI may be used while subband CQI may be only for an indicated CSI-RS group. This approach may be viewed as an extension of best-m reporting with explicit best CSI-RS group selection and may be best suited for dynamic point selection.

In certain aspects, the number of potential feedback candidate transmission point antennas may exceed the number of antennas defined for the current codebooks. In order to address this, the UE may report the set of detected candidate transmission points, from which the eNB may select an appropriate reporting set using one of the methods described above.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communications, the method comprising:
   determining a plurality of channel state information reference signal (CSI-RS) groups for feedback reporting, each one of the plurality of CSI-RS groups comprising a set of CSI-RS ports assigned to antennas of multiple transmission points, each transmission point of the multiple transmission points comprising a cell identifier (ID);
   transmitting, to a user equipment (UE), an indicator that identifies the plurality of CSI-RS groups to the UE;
   transmitting, to the UE, CSI-RSs corresponding to the plurality of CSI-RS groups;
   providing signaling to the UE to restrict feedback reporting to a set of the plurality of CSI-RS groups; and
   receiving feedback reports, from the UE, corresponding to at least one CSI-RS group of the set of the plurality of CSI-RS groups.

2. The method of claim 1, wherein:
   at least one CSI-RS group of the plurality of CSI-RS groups corresponds to multiple transmission points.

3. The method of claim 1, wherein the set of CSI-RS ports of different CSI-RS groups are mapped to a same set of antennas.

4. The method of claim 1, wherein a cell specific reference signal (CRS) of the UE's serving cell is used as an additional virtual CSI-RS group.

5. The method of claim 1, wherein each one of the plurality of CSI-RS groups is configured with a scrambling sequence corresponding to a CSI-RS group-specific virtual cell ID.

6. The method of claim 1, wherein the feedback reporting is restricted by dynamically signaling to indicate the set of the plurality of CSI-RS groups to the UE via additional bits in a grant requesting an aperiodic feedback report or by reusing existing bits in the grant.

7. The method of claim 1, wherein separate periodic feedback reporting instances are configured for the set of the plurality of CSI-RS groups.

8. The method of claim 1, further comprising:
   signaling the at least one CSI-RS group of the plurality of CSI-RS groups to the UE via a CSI-RS port pattern configuration.

9. The method of claim 1, wherein the receiving comprises receiving, in different reporting instances, feedback reports that are cycled across each of the plurality of CSI-RS groups in a predefined cycling pattern.

10. The method of claim 1, wherein different CSI-RS groups are defined for different subframe types.

11. The method of claim 1, wherein at least one of the feedback reports is based on the set of the plurality of CSI-RS groups.

12. The method of claim 1, further comprising signaling one or more codebooks per CSI-RS group or for different CSI-RS group combinations.

13. The method of claim 1, wherein at least one feedback report indicates the plurality of CSI-RS groups with CSI-RSs that satisfy a received signal strength or capacity criterion.

14. The method of claim 1, further comprising signaling a codebook with entries that are structured such that sets of one or more antenna ports are turned off.

15. The method of claim 1, wherein the set of the plurality of CSI-RS groups is configured for reporting at least a precoding matrix indicator (PMI), a channel quality indicator (CQI), a rank indicator (RI), or a combination thereof based at least in part on feedback of signal strength indicators received from the UE for the set of the plurality of CSI-RS groups.

16. A method for wireless communications, the method comprising:
   receiving an indicator that identifies a plurality of channel state information reference signal (CSI-RS) groups for feedback reporting, each one of the plurality of CSI-RS groups comprising a set of CSI-RS ports assigned to antennas of multiple transmission points, each transmission point of the multiple transmission points comprising a cell identifier (ID);
   receiving CSI-RSs corresponding to the plurality of CSI-RS groups;
   performing channel measurements for at least one of the plurality of CSI-RS groups;
   receiving signaling to restrict feedback reporting to a set of the plurality of CSI-RS groups; and
   transmitting a feedback report corresponding to at least one CSI-RS group of the set of the plurality of CSI-RS groups.

17. The method of claim 16, wherein:
   at least one CSI-RS group of the plurality of CSI-RS groups corresponds to multiple transmission points.

18. The method of claim 16, wherein CSI-RS ports of different CSI-RS groups are mapped to a same set of antennas.

19. The method of claim 16, wherein a cell specific reference signal (CRS) corresponding to a serving cell is used as an additional virtual CSI-RS group.

20. The method of claim 16, wherein the feedback report comprises at least a precoding matrix indicator (PMI), a channel quality indicator (CQI), a rank indicator (RI), a received signal strength indicator, a CSI-RS group selection indicator, or a combination thereof.

21. The method of claim 16, wherein the determining comprises receiving a CSI-RS port pattern configuration indicating the plurality of CSI-RS groups.

22. The method of claim 16, wherein the transmitting comprises transmitting, in different reporting instances, a plurality of feedback reports that are cycled across the plurality of CSI-RS groups in a predefined cycling pattern.

23. The method of claim 16, wherein each one of the plurality of CSI-RS groups is configured with a scrambling sequence corresponding to a CSI-RS group specific virtual cell ID.

24. The method of claim 16, wherein different CSI-RS groups are defined for different subframe types.

25. The method of claim 16, further comprising receiving signaling indicating at least one codebook to use per CSI-RS group or different CSI-RS group combinations.

26. The method of claim 16, wherein at least one feedback report indicates the plurality of CSI-RS groups with CSI-RSs that satisfy a received signal strength or capacity criterion.

27. The method of claim 16, wherein at least one feedback report indicates at least one bandwidth part from at least one CSI-RS group selected from the plurality of CSI-RS groups corresponding to CSI-RSs that satisfy a received signal strength or capacity criterion.

28. The method of claim 16, wherein the feedback report is generated based at least in part on channel measurements separately for the plurality of CSI-RS groups.

29. The method of claim 16, wherein the feedback report is generated based at least in part on channel measurements for different aggregations of the plurality of CSI-RS groups and wherein the feedback report is based at least in part on an aggregation of the plurality of CSI-RS groups.

30. The method of claim 16 wherein a reporting payload of the feedback report is encoded jointly across the plurality of CSI-RS groups.

31. The method of claim 16, wherein the feedback report is based on the set of the plurality of CSI-RS groups.

32. An apparatus for wireless communications, comprising:
a memory unit; and
at least one processor coupled to the memory unit, the at least one processor being configured:
to determine a plurality of channel state information reference signal (CSI-RS) groups for feedback reporting, each one of the plurality of CSI-RS groups comprising a set of CSI-RS ports assigned to antennas of multiple transmission points, each transmission point of the multiple transmission points comprising a cell identifier (ID);
to transmit, to a user equipment (UE), an indicator that identifies the plurality of CSI-RS groups to the UE;
to transmit, to the UE, CSI-RSs corresponding to the plurality of CSI-RS groups;
to provide signaling to the UE to restrict feedback reporting to a set of the plurality of CSI-RS groups; and
to receive feedback reports, from the UE, corresponding to at least one CSI-RS group of the set of the plurality of CSI-RS groups.

33. The apparatus of claim 32, wherein:
at least one CSI-RS group of the plurality of CSI-RS groups corresponds to multiple transmission points.

34. The apparatus of claim 32, wherein CSI-RS ports of different CSI-RS groups are mapped to a same set of antennas.

35. The apparatus of claim 32, wherein at least one of the feedback reports is based on the set of the plurality of CSI-RS groups.

36. The apparatus of claim 32, wherein the at least one processor is further configured to signal the plurality of CSI-RS groups to the UE via a CSI-RS port pattern configuration.

37. The apparatus of claim 32, wherein the at least one processor is further configured to signal at least one codebook for each CSI-RS group or for different CSI-RS group combinations.

38. An apparatus for wireless communications, comprising:
means for determining a plurality of channel state information reference signal (CSI-RS) groups for feedback reporting, each one of the plurality of CSI-RS groups comprising a set of CSI-RS ports assigned to antennas of multiple transmission points, each transmission point of the multiple transmission points comprising a cell identifier (ID);
means for transmitting, to a user equipment (UE), an indicator that identifies the plurality of CSI-RS groups to the UE;
means for transmitting, to the UE, CSI-RSs corresponding to the plurality of CSI-RS groups;
means for providing signaling to the UE to restrict feedback reporting to a set of the plurality of CSI-RS groups; and
means for receiving feedback reports, from the UE, corresponding to at least one CSI-RS group of the set of the plurality of CSI-RS groups.

39. The apparatus of claim 38, wherein:
at least one of CSI-RS groups of the plurality of CSI-RS groups corresponds to multiple transmission points.

40. The apparatus of claim 38, wherein CSI-RS ports of different CSI-RS groups are mapped to a same set of antennas.

41. The apparatus of claim 38, wherein at least one of the feedback reports is based on the set of the plurality of CSI-RS groups.

42. The apparatus of claim 38, further comprising means for signaling the plurality of CSI-RS groups to the UE via a CSI-RS port pattern configuration.

43. The apparatus of claim 38, further comprising means for signaling at least one codebook for each CSI-RS group or for different CSI-RS group combinations.

44. An apparatus for wireless communications, comprising:
a memory unit; and
at least one processor coupled to the memory unit, the at least one processor being configured:
to receive an indicator that identifies a plurality of channel state information reference signal (CSI-RS) groups for feedback reporting, each one of the plurality of CSI-RS groups comprising a set of CSI-RS ports assigned to antennas of multiple transmission points, each transmission point of the multiple transmission points comprising a cell identifier (ID);
to receive CSI-RSs corresponding to the plurality of CSI-RS groups;
to perform channel measurements for at least one of the plurality of CSI-RS groups;
to receive signaling to restrict feedback reporting to a set of the plurality of CSI-RS groups; and
to transmit a feedback report corresponding to at least one CSI-RS group of the set of the plurality of CSI-RS groups.

45. The apparatus of claim 44, wherein:
at least one CSI-RS group of the plurality of CSI-RS groups corresponds to multiple transmission points.

46. The apparatus of claim 44, wherein CSI-RS ports of different CSI-RS groups are mapped to a same set of antennas.

47. The apparatus of claim 44, wherein the feedback report is based on the set of the plurality of CSI-RS groups.

48. The apparatus of claim 44, in which the at least one processor is further configured to receive signaling indicating at least one codebook to use per CSI-RS group or different CSI-RS group combinations.

49. An apparatus for wireless communications, comprising:
means for receiving an indicator that identifies a plurality of channel state information reference signal (CSI-RS) groups for feedback reporting, each one of the plurality of CSI-RS groups comprising a set of CSI-RS ports assigned to antennas of multiple transmission points, each transmission point of the multiple transmission points comprising a cell identifier (ID);

means for receiving CSI-RSs corresponding to the plurality of CSI-RS groups;

means for performing channel measurements for at least one of the plurality of CSI-RS groups;

means for receiving signaling to restrict feedback reporting to a set of the plurality of CSI-RS groups; and means for transmitting a feedback report corresponding to at least one CSI-RS group of the set of the plurality of CSI-RS groups.

50. The apparatus of claim 49, wherein:

at least one CSI-RS group of the plurality of CSI-RS groups corresponds to multiple transmission points.

51. The apparatus of claim 49, wherein CSI-RS ports of different CSI-RS groups are mapped to a same set of antennas.

52. The apparatus of claim 49, wherein the feedback report is based on the set of the plurality of CSI-RS groups.

53. The apparatus of claim 49, further comprising means for receiving signaling indicating at least one codebook to use per CSI-RS group or different CSI-RS group combinations.

54. A non-transitory computer-readable medium having program code recorded thereon, the program code comprising:

program code to determine a plurality of channel state information reference signal (CSI-RS) groups for feedback reporting, each one of the plurality of CSI-RS groups comprising a set of CSI-RS ports assigned to antennas of multiple transmission points, each transmission point of the multiple transmission points comprising a cell identifier (ID);

program code to transmit, to a user equipment (UE), an indicator that identifies the plurality of CSI-RS groups to the UE;

program code to transmit, to the UE, CSI-RSs corresponding to the plurality of CSI-RS groups;

program code to provide signaling to the UE to restrict feedback reporting to a set of the plurality of CSI-RS groups; and program code to receive feedback reports, from the UE, corresponding to at least one CSI-RS group of the set of the plurality of CSI-RS groups.

55. A non-transitory computer-readable medium having program code recorded thereon, the program code comprising:

program code to receive an indicator that identifies a plurality of channel state information reference signal (CSI-RS) groups for feedback reporting, each one of the plurality of CSI-RS groups comprising a set of CSI-RS ports assigned to antennas of multiple transmission points, each transmission point of the multiple transmission points comprising a cell identifier (ID);

program code to receive CSI-RSs corresponding to the plurality of CSI-RS groups;

program code to perform channel measurements for at least one of the plurality of CSI- RS groups;

program code to receive signaling to restrict feedback reporting to a set of the plurality of CSI-RS groups; and program code to transmit a feedback report corresponding to at least one CSI-RS group of the set of the plurality of CSI-RS groups.

* * * * *